US012686454B2

(12) United States Patent
    Cui et al.

(10) Patent No.: US 12,686,454 B2
(45) Date of Patent: Jul. 21, 2026

(54) STACKABLE TRAILER SYSTEM AND ASSOCIATED METHODS

(71) Applicant: Good RV Equipment INC, Bellingham, WA (US)

(72) Inventors: Yanfeng Cui, Bellingham, WA (US); Kelly Zuoer Cui, Bellingham, WA (US)

(73) Assignee: Good RV Equipment INC, Bellingham, WA (US)

( * ) Notice: Subject to any disclaimer, the term of this patent is extended or adjusted under 35 U.S.C. 154(b) by 536 days.

(21) Appl. No.: 18/168,472

(22) Filed: Feb. 13, 2023

(65) Prior Publication Data

US 2024/0270336 A1      Aug. 15, 2024

(51) Int. Cl.
    *B62D 63/08*      (2006.01)
    *B62D 63/06*      (2006.01)

(52) U.S. Cl.
    CPC ........... *B62D 63/08* (2013.01); *B62D 63/061* (2013.01)

(58) Field of Classification Search
    CPC ...... B62D 63/08; B62D 63/061; B62D 43/02; B62D 21/20; B62D 35/001; B62D 63/062
    See application file for complete search history.

(56) References Cited

U.S. PATENT DOCUMENTS

| | | | | | |
|---|---|---|---|---|---|
| 7,866,933 | B2 * | 1/2011 | Welch | ................... | B60P 1/6445 414/458 |
| 8,182,193 | B2 * | 5/2012 | Gaudet | ................. | B60G 3/145 280/6.151 |
| 9,422,015 | B1 * | 8/2016 | Fraley | .................... | B62D 21/09 |
| 9,932,169 | B2 * | 4/2018 | Kraft | .................... | B65D 88/522 |
| 11,351,903 | B1 * | 6/2022 | Williamson | ............ | B60P 1/027 |
| 11,878,560 | B1 * | 1/2024 | Williamson | ............. | B60D 1/46 |
| 12,345,065 | B2 * | 7/2025 | Allison | ..................... | E04H 3/28 |
| 2006/0001230 | A1 * | 1/2006 | Finch | ................... | B62K 27/003 280/204 |
| 2008/0100037 | A1 * | 5/2008 | Greene, III | .......... | B62D 63/061 280/656 |
| 2012/0181760 | A1 * | 7/2012 | Catford | ................... | B60P 1/027 280/43.18 |
| 2016/0090234 | A1 * | 3/2016 | Ronstadt | ................ | B62D 33/08 220/6 |
| 2016/0116213 | A1 * | 4/2016 | Dykes, Jr. | ............... | F26B 25/10 296/25 |
| 2022/0212522 | A1 * | 7/2022 | Skipton | .............. | B60H 1/00364 |
| 2023/0312000 | A1 * | 10/2023 | Tiramani | ............... | B62D 21/20 414/482 |
| 2023/0322311 | A1 * | 10/2023 | Awad | ..................... | B60P 1/6418 |
| 2024/0308600 | A1 * | 9/2024 | Pan | ...................... | B62D 35/008 |
| 2025/0083646 | A1 * | 3/2025 | Mansfield | .............. | G05D 23/20 |

* cited by examiner

*Primary Examiner* — Valentin Neacsu
*Assistant Examiner* — Marlon A Arce
(74) *Attorney, Agent, or Firm* — Perkins Coie LLP

(57)      ABSTRACT

Stackable trailer systems and associated methods are provided. In some embodiments, the trailer system includes (1) a platform structure sized in accordance with a dimension of a shipping container; (2) a corner module configured to be positioned at a corner of the platform structure; and (3) a wheel assembly coupled to the platform structure and configured to move the platform structure. The corner module is formed with an upper recess and a lower recess. The upper recess is configured to receive an insert connector, and the lower access is configured to receive a post extending from the platform structure.

17 Claims, 35 Drawing Sheets

100

400

401

R

407

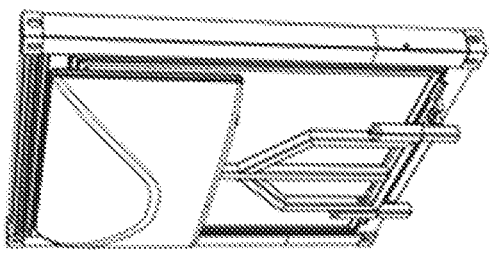
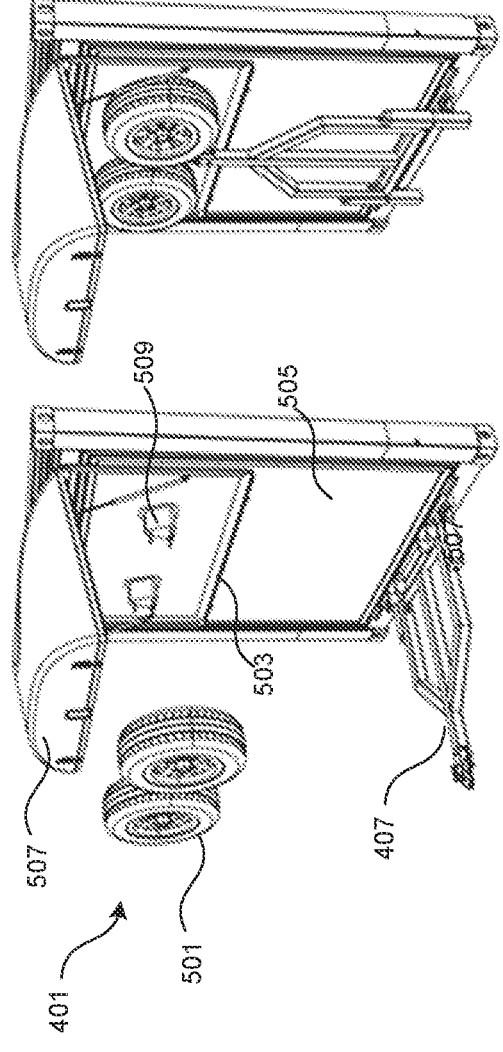
*FIG. 5B*

700C

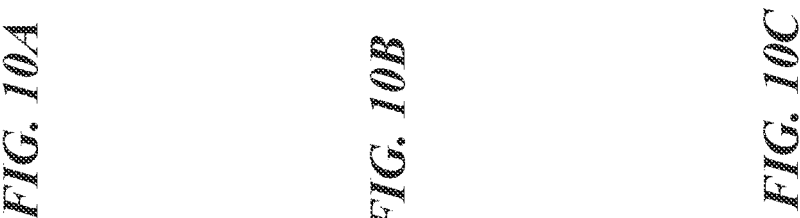
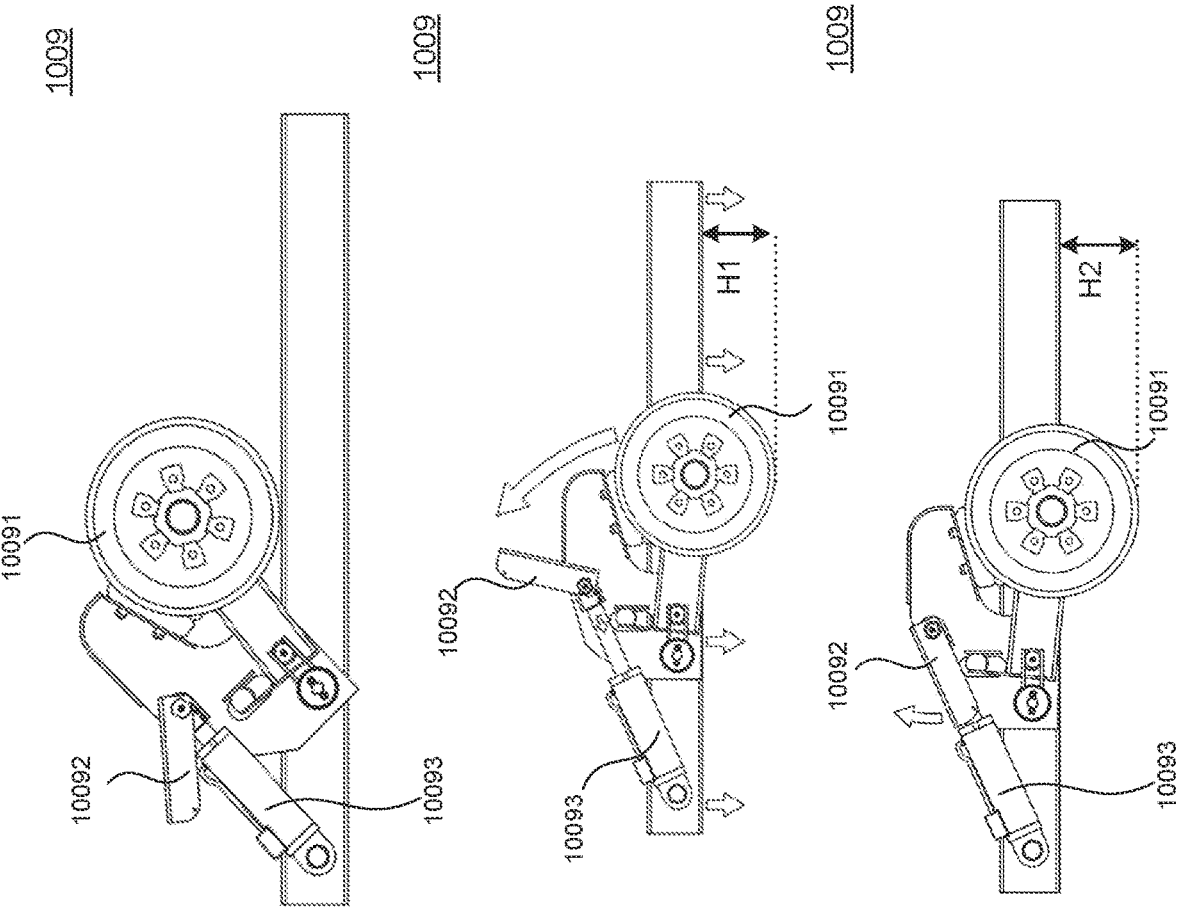
*FIG. 10A*
*FIG. 10B*
*FIG. 10C*

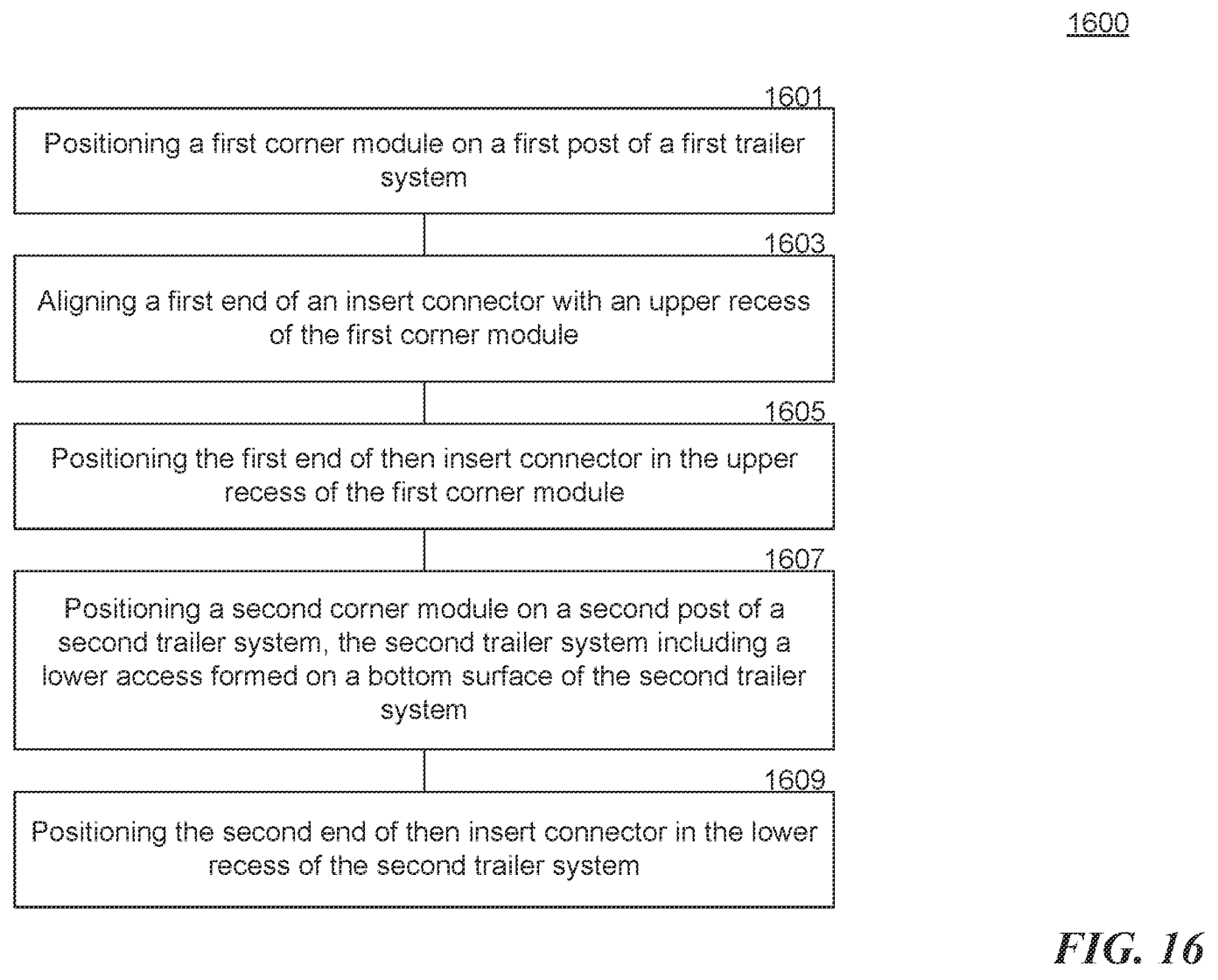

1600

1601

Positioning a first corner module on a first post of a first trailer system

1603

Aligning a first end of an insert connector with an upper recess of the first corner module

1605

Positioning the first end of then insert connector in the upper recess of the first corner module

1607

Positioning a second corner module on a second post of a second trailer system, the second trailer system including a lower access formed on a bottom surface of the second trailer system

1609

Positioning the second end of then insert connector in the lower recess of the second trailer system

*FIG. 16*

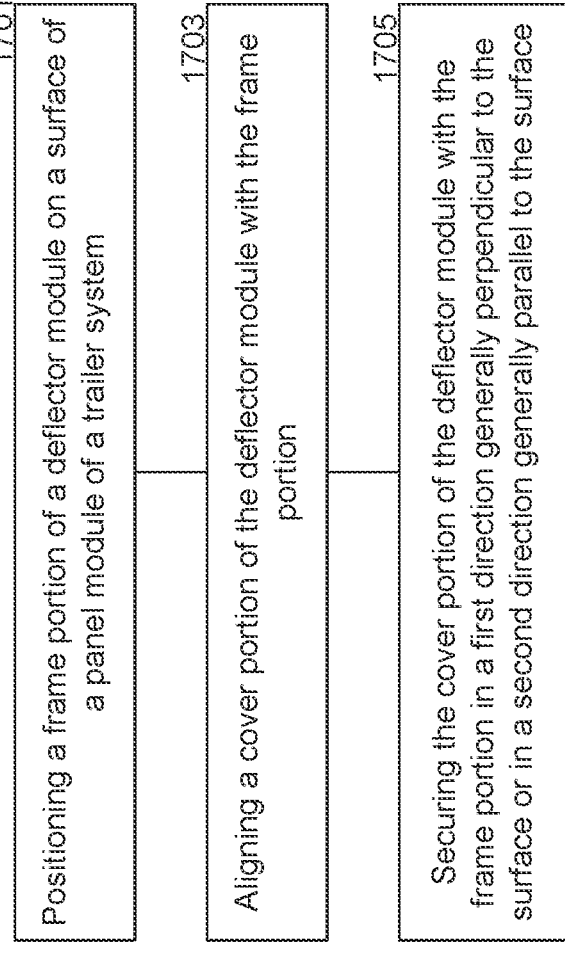

1700

1701

Positioning a frame portion of a deflector module on a surface of a panel module of a trailer system

1703

Aligning a cover portion of the deflector module with the frame portion

1705

Securing the cover portion of the deflector module with the frame portion in a first direction generally perpendicular to the surface or in a second direction generally parallel to the surface

2100B
2105
2007
2105
2105
2105
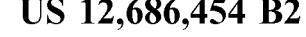
*FIG. 21B*

2100C

2200

2300

2301

2311

2313

2300

STACKABLE TRAILER SYSTEM AND ASSOCIATED METHODS

TECHNICAL FIELD

The present disclosure relates to trailer systems and associated methods. More specifically, stackable trailer systems that can be conveniently dissembled, folded, and stacked in a shipping container are provided.

BACKGROUND

Trailers are popular for transportation and recreational uses. Traditional trailers require large spaces to store when they are not in use. Although there are certain "pop-up" designs allowing reducing their sizes to some extent, these designs still require significant amount of storage spaces and cannot be stored in a compact configuration (e.g., in a shipping container). Therefore, it is advantageous to have an improved system to address the foregoing need.

SUMMARY

The present disclosure provides stackable trailer systems and associated methods for assembling, disassembling, storing, and operating the trailer systems. In some embodiments, the stackable trailer system includes a platform structure, corner modules, panel modules, a towing bar assembly, a wheel assembly, a deflector module, and a door assembly. Embodiments of the stackable trailer system are discussed in detail with reference to FIGS. 1-6.

The platform structure is configured to support other components of the system. In some embodiments, the platform structure can be sized in accordance with a shipping container such that a plurality of the platform structure can be stored therein. Embodiments of the platform structure are discussed in detail with reference to FIGS. 3, 8A, and 8B. Embodiments of stacked trailer systems are discussed in detail with reference to FIGS. 15A and 15B.

The corner modules are configured to be positioned at the corners of the platform structure. The corner modules can provide structural support to other components such as the panel modules and the door assembly. The corner modules are also configured to enable the trailer systems to be stacked on one another. More particularly, each of the corner modules can be formed with an upper recess and a lower recess. The upper recess and the lower recess are each configured to accommodate one end of an insert connector, when two or more trailer systems are dissembled, folded, and folded. Embodiments of the corner modules are discussed in detail with reference to FIGS. 1-3 and 15A.

The panel modules are configured to provide enclosure and surrounding support to the stackable trailer system. In some embodiments, the panel module are made of aluminum. In some embodiments, the panel module are made of a whole, uncut aluminum panel so as to provide sufficient structural rigidity. Embodiments of the panel modules are discussed in detail with reference to FIGS. 1-6.

The towing bar assembly is configured to connect the stackable trailer system to a towing vehicle/machine. The towing bar assembly is foldable such that it is convenient to store. The towing bar assembly also includes a security mechanism such that the towing bar assembly can be securely, safely positioned when the towing bar assembly is in use (e.g., towing) or is folded (e.g., stored). Embodiments of the towing bar assembly are discussed in detail with reference to FIGS. 1-6 and 12A-C.

The wheel assembly is configured to enable the stackable trailer system to be moved and towed. The wheel assembly is adjustable such that the stackable trailer system can be stored or in operation. In some embodiments, the wheel assembly can have one or more wheels depending on various designs. Embodiments of the wheel assembly are discussed in detail with reference to FIGS. 1-3, 8A-B, 9A-C, 10A-C, and 11A-B.

The deflector module is configured to improve aero-dynamic characteristics of the stackable trailer system. The deflector module is engineered to a specific shape such that it can enhance aero-dynamic performance of the stackable trailer system as a whole. The deflector module is also configured to accommodate other components of the stackable trailer system (e.g., the towing bar assembly when it is folded) or serve as a storage space (e.g., for spare tires, luggage, etc.). Embodiments of the deflector module are discussed in detail with reference to FIGS. 4-7B.

The door assembly is configured to provide users access to the stackable trailer system. The door assembly can be positioned at one side (e.g., back side) of the stackable trailer system. In some embodiments, the door assembly can be sized to fulfill different needs (e.g., for human access or for cargo access, etc.) The door assembly is configured to provide users with a smooth, easy access by eliminating a gap when the door assembly is opened. Embodiments of the door assembly are discussed in detail with reference to FIGS. 2, 13, and 14.

One aspect of the present disclose includes methods for assembling, disassembling, folding, storing and/or stacking the components of the present trailer system. Another aspect of the present disclose includes methods for installing/uninstalling a deflector module to/from the present trailer system.

One aspect of the present disclose includes methods for operating the wheel assembly in accordance with statuses the present trailer system. In some embodiments, the statuses of the trailer system include towed/moved, stored, idle, camping, etc.

In some embodiments, the present method can be implemented by a tangible, non-transitory, computer-readable medium having processor instructions stored thereon that, when executed by one or more processors, cause the one or more processors to perform one or more aspects/features of the method described herein. In other embodiments, the present method can be implemented by a system comprising a computer processor and a non-transitory computer-readable storage medium storing instructions that when executed by the computer processor cause the computer processor to perform one or more actions of the method described herein.

BRIEF DESCRIPTION OF THE DRAWINGS

To describe the technical solutions in the implementations of the present disclosure more clearly, the following briefly describes the accompanying drawings. The accompanying drawings show merely some aspects or implementations of the present disclosure, and a person of ordinary skill in the art may still derive other drawings from these accompanying drawings without creative efforts.

FIGS. 4 and 5A-5B are isometric, schematic views of a trailer system with a deflector module in accordance with one or more implementations of the present disclosure.

FIGS. 10A-10C are side, schematic views illustrating operations of another wheel assembly (e.g., single-wheel design) in accordance with one or more implementations of the present disclosure.

FIG. 16 is a flowchart of a method for stacking a trailer system in accordance with one or more implementations of the present disclosure.

FIG. 17 is a flowchart of a method for installing a deflector module in accordance with one or more implementations of the present disclosure.

FIGS. 21A-21C are schematic views illustrating assembling of the trailer system in accordance with one or more implementations of the present disclosure.

DETAILED DESCRIPTION

To describe the technical solutions in the implementations of the present disclosure more clearly, the following briefly describes the accompanying drawings. The accompanying drawings show merely some aspects or implementations of the present disclosure, and a person of ordinary skill in the art may still derive other drawings from these accompanying drawings without creative efforts.

Figure 1:
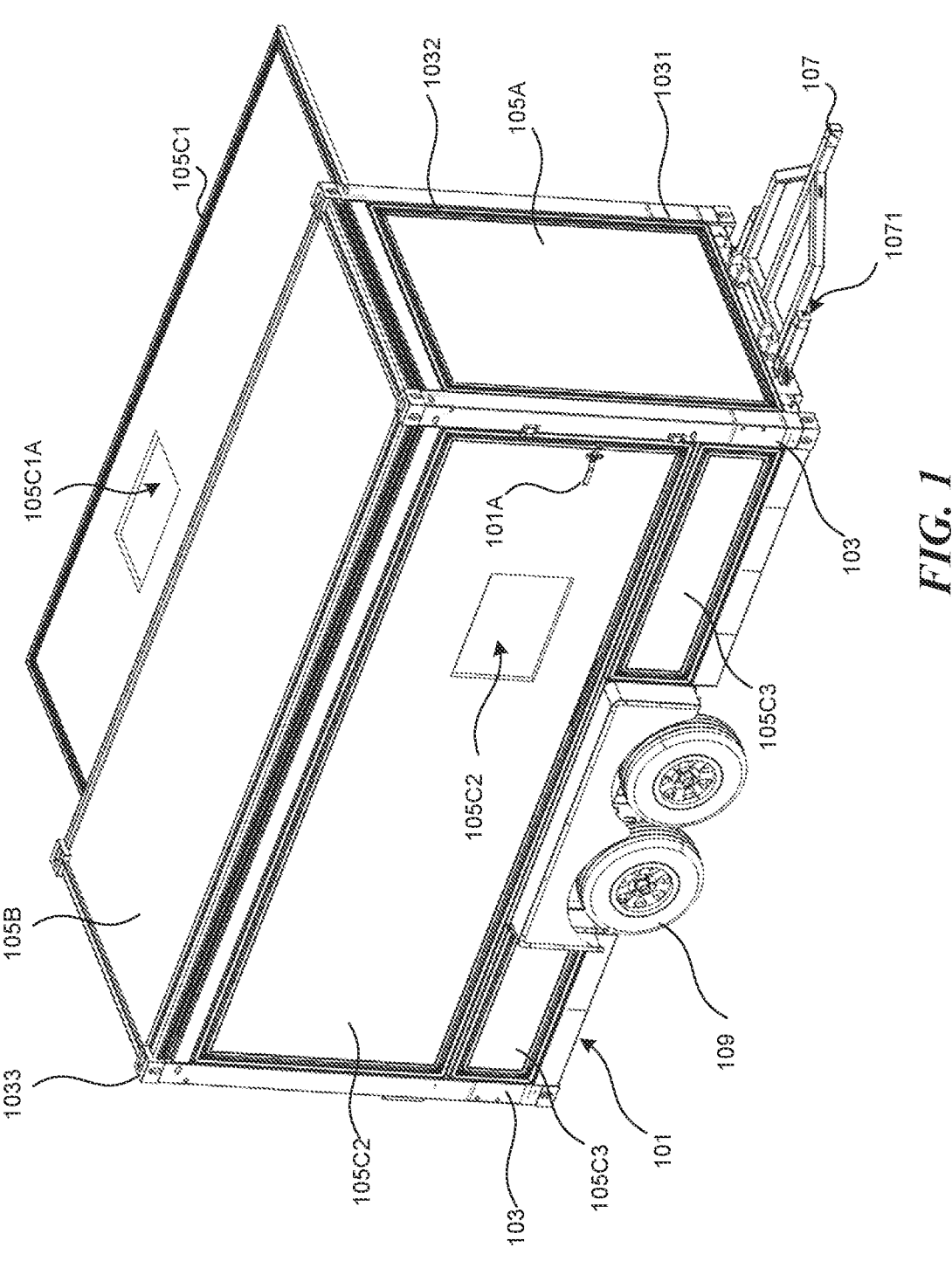
FIG. 1 is an isometric, schematic view of a trailer system in accordance with one or more implementations of the present disclosure.

FIG. 1 is an isometric, schematic view of a trailer system 100 in accordance with one or more implementations of the present disclosure. As shown, the trailer system 100 includes a platform structure 101, corner modules 103, panel modules 105 (including a front panel 105A, a top panel 105B, side panels 105C1, and lower side panels 105C3), a towing bar assembly 107, and a wheel assembly 109.

The platform structure 101 supports other components of the system 100. The platform structure 101 also provides structural support/rigidity to the system 100. In some embodiments, the platform structure 100 can be sized in accordance with a shipping container (e.g., 8'×8.5'×20' or other suitable dimensions) such that the system 100 can be folded, stacked, and stored therein.

The corner modules 103 are configured to be positioned at the corners of the platform structure 103. The corner modules can include a lower portion 1031 and an upper portion 1032 (details in FIG. 3). The lower portion 1031 is positioned on a post (not shown in FIG. 1; see element 1501 in FIG. 15A) extended from the platform structure 101 such that the lower portion 1031 can be connected with the platform structure 101. The lower portion 1031 and the upper portion 1032 can further be connected by an insert connector 1503 (not shown in FIG. 1; see details in FIG. 15A). The corner modules 103 can then be connected to the panel modules 105.

The corner modules 103 enable the trailer system 100 to be stacked on one another. More particularly, each of the corner modules 103 can be formed with an upper recess 1033 and a lower recess 1034 (not shown in FIG. 1; see FIG. 3). The upper recess 1033 and the lower recess 1034 are each configured to accommodate one end of an insert connector (e.g., insert connector 1503 in FIG. 15A), when two or more trailer systems 100 are dissembled, folded, and folded. In some embodiments the platform structure 101 can also be formed with a recess having functions similar to the lower recess 1034 at its bottom surface.

The panel modules 105 are configured to provide enclosure and surrounding support to the trailer system 100. As shown, the panel modules 105 includes the front panel 105A, the top panel 105B, the side panels 105C1, 105C2, and the lower side panels 105C3. Depending on user's needs and design, the panel modules 105 can include an opening 1051CA or a window 105C2A for natural lighting or ventilation. In some embodiments, the panel module 105 can be made of aluminum. In some embodiments, the panel module 105 are made of a whole, uncut aluminum panel so as to provide sufficient structural rigidity. In some embodiments, the panel modules 105 can be made of two aluminum surface layers with an insulation layer therebetween. The two aluminum surface layers and the insulation layer can be heat pressed and/or glued/sealed. In some embodiments, the panel modules 105 can be positioned at the top, the bottom, or the sides of the platform structure 101. In some embodiments, the panel modules 105 can be formed in different shapes depending on various designs.

The towing bar assembly 107 is configured to connect the trailer system 100 to a towing vehicle/machine. The towing bar assembly 107 is foldable such that it is convenient to store. The towing bar assembly 107 includes a security mechanism 1071 such that the towing bar assembly 107 can be securely, safely positioned when the towing bar assembly is in use. In some embodiments, the security mechanism 1071 can include a bar that extends to the platform structure 101 (see FIG. 3) so as to ensure the towing bar assembly 107 does not "fold" (see FIGS. 12B and 12C) when towing (see FIG. 12A).

The wheel assembly 109 is configured to enable the trailer system 100 to be moved and towed. The wheel assembly 109 is adjustable and can be configured to be moved between different positions such that the stackable trailer system can be stored or in operation. In some embodiments, when the trailer system 100 is moved/towed, the height between the wheel assembly 109 to a ground surface can be adjusted due to multiple needs, such as moving on different terrain surfaces.

In other embodiments, when the trailer system 100 is folded/stored, the wheel assembly 109 can be retracted or positioned in the platform structure for easy storage. In some embodiments, the wheel assembly 109 can have one or more wheels depending on various designs. For example, the embodiments in FIGS. 1-3 include a double-wheel design (four wheels in total; two on each side), whereas the embodiments in FIGS. 4-6 include a single-wheel design (two wheels in total; one on each side).

Figure 2:
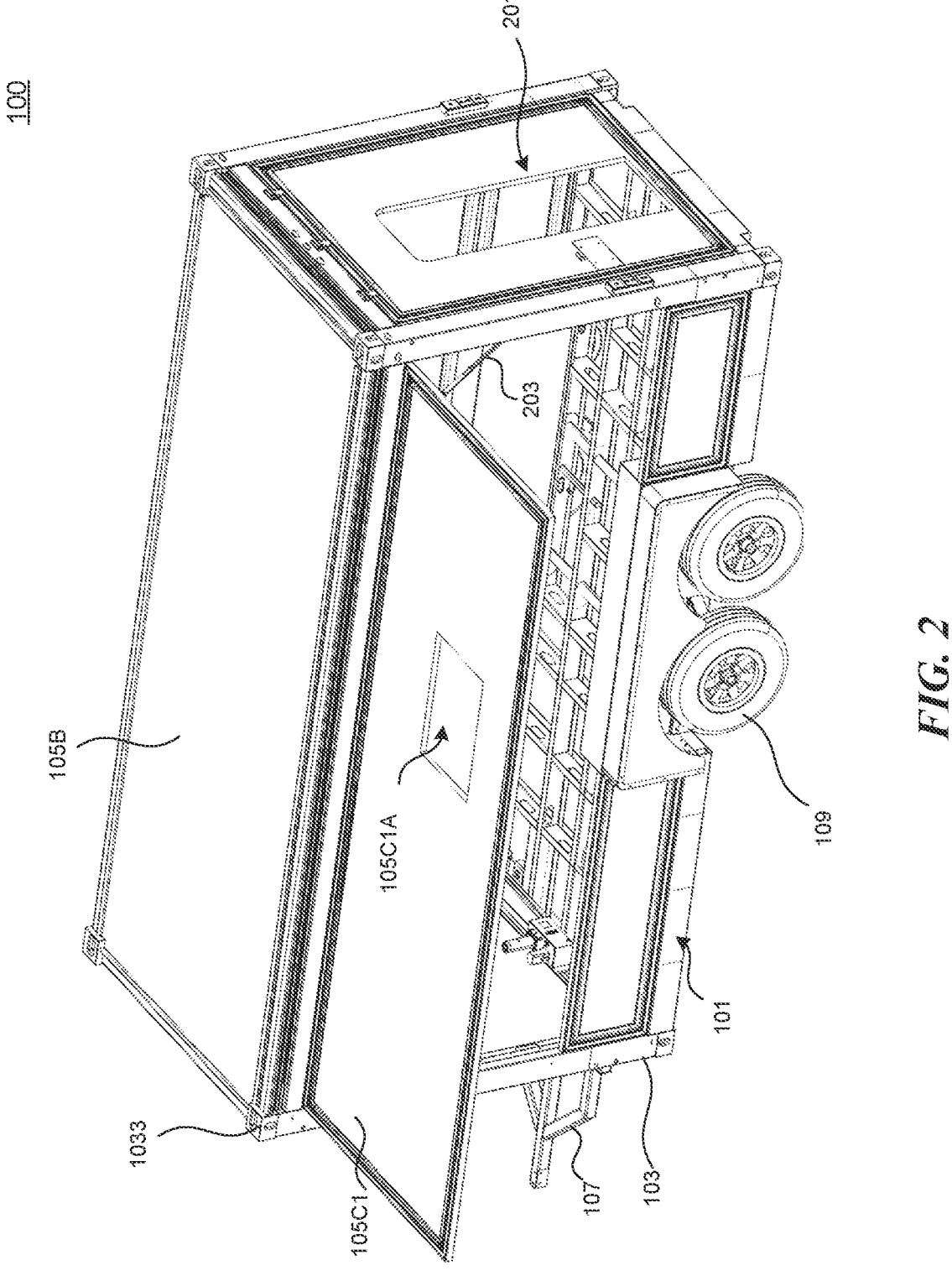
FIG. 2 is another isometric, schematic view of a trailer system in accordance with one or more implementations of the present disclosure.

FIG. 2 is another isometric, schematic view of the trailer system 100 in accordance with one or more implementations of the present disclosure. As shown, the trailer system 100 includes a door assembly 201. The door assembly 201 is configured to provide users access to the trailer system 100. The door assembly 201 can be positioned at one side (e.g., back side) opposite to the towing bar assembly 107 (e.g., front side). In some embodiments, the door assembly 201 can be sized to fulfill different needs (e.g., for human access or for cargo access, etc.)

As shown in FIG. 2, the trailer system 100 can include a hydraulic component 203 configured to move/rotate the panel modules 105 (e.g., side panel 105C1). In some embodiments, the hydraulic component 203 can be positioned in other suitable locations so as to move/rotate the panel modules 105 according to various designs.

Figure 3:
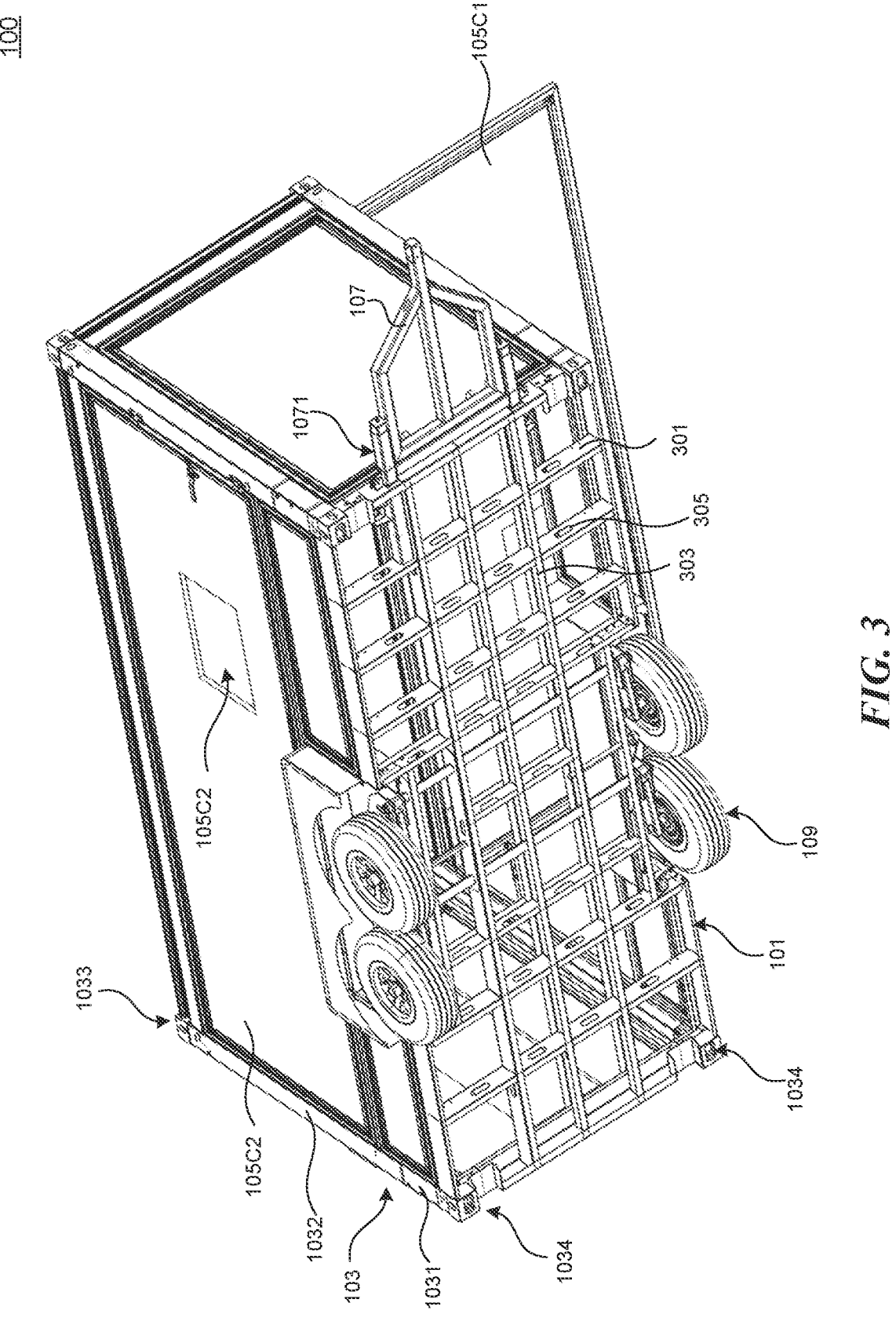
FIG. 3 is a bottom isometric, schematic view of a trailer system in accordance with one or more implementations of the present disclosure.

FIG. 3 is a bottom isometric, schematic view of the trailer system 100 in accordance with one or more implementations of the present disclosure. As shown in FIG. 3, the platform structure 101 can include multiple lateral members 301 and longitudinal members 303 so as to provide structural support to the trailer system 100. For example, the wheel assembly 109 can be connected to the lateral members 301 and the longitudinal members 303. In some embodiments, an opening 305 can be formed on one or more of the lateral members 301 and the longitudinal members 303. The opening 305 can be formed for weight reduction, ease of installation, structural designs, etc.

As also shown in FIG. 3, the security mechanism 1071 (e.g., a bar) extends to the platform structure 101 and can be securely connected with at least one of the lateral members 301 and the longitudinal members 303. By this arrangement, the towing bar assembly 107 is secured when towing.

Figure 4:
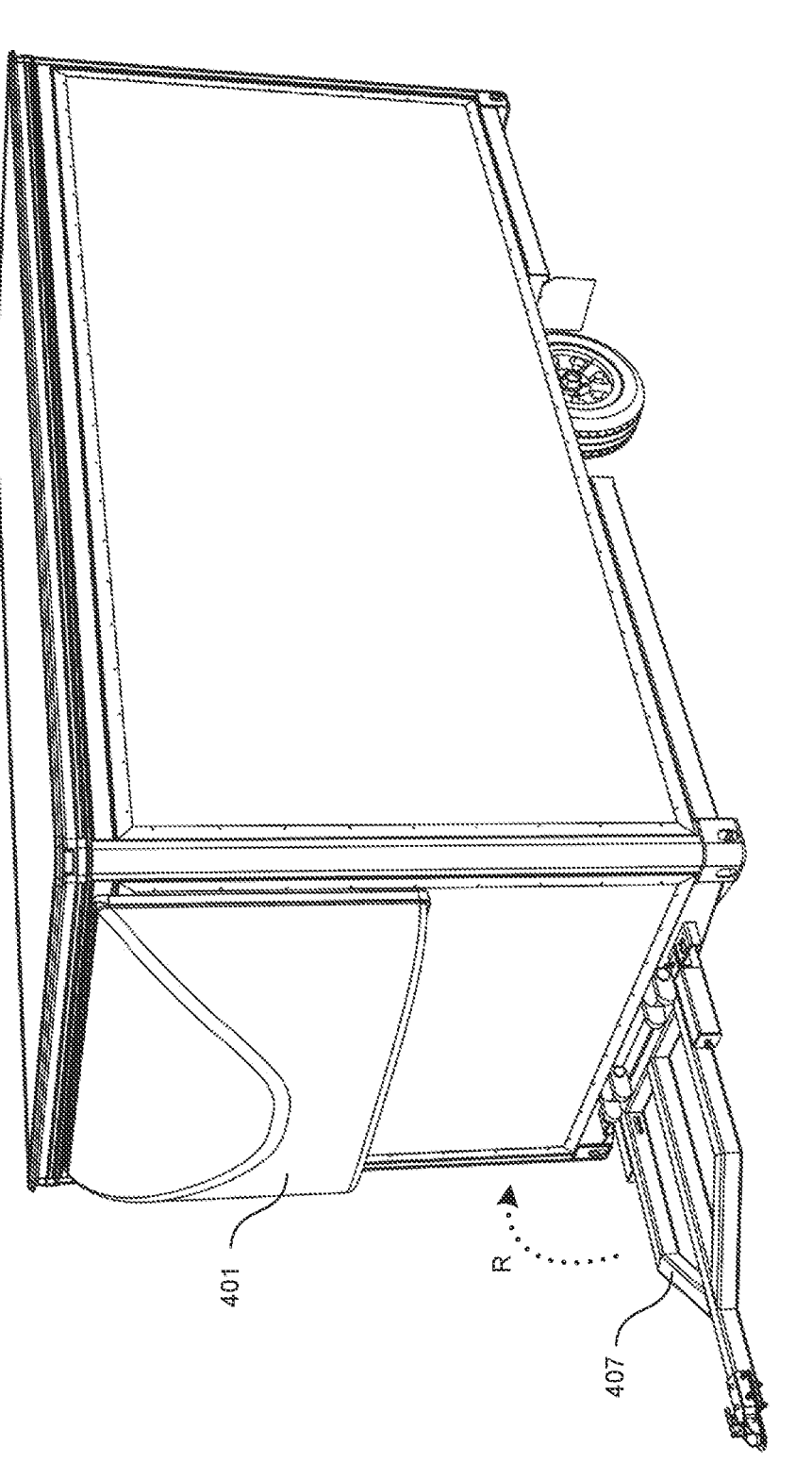
Figure 5A:
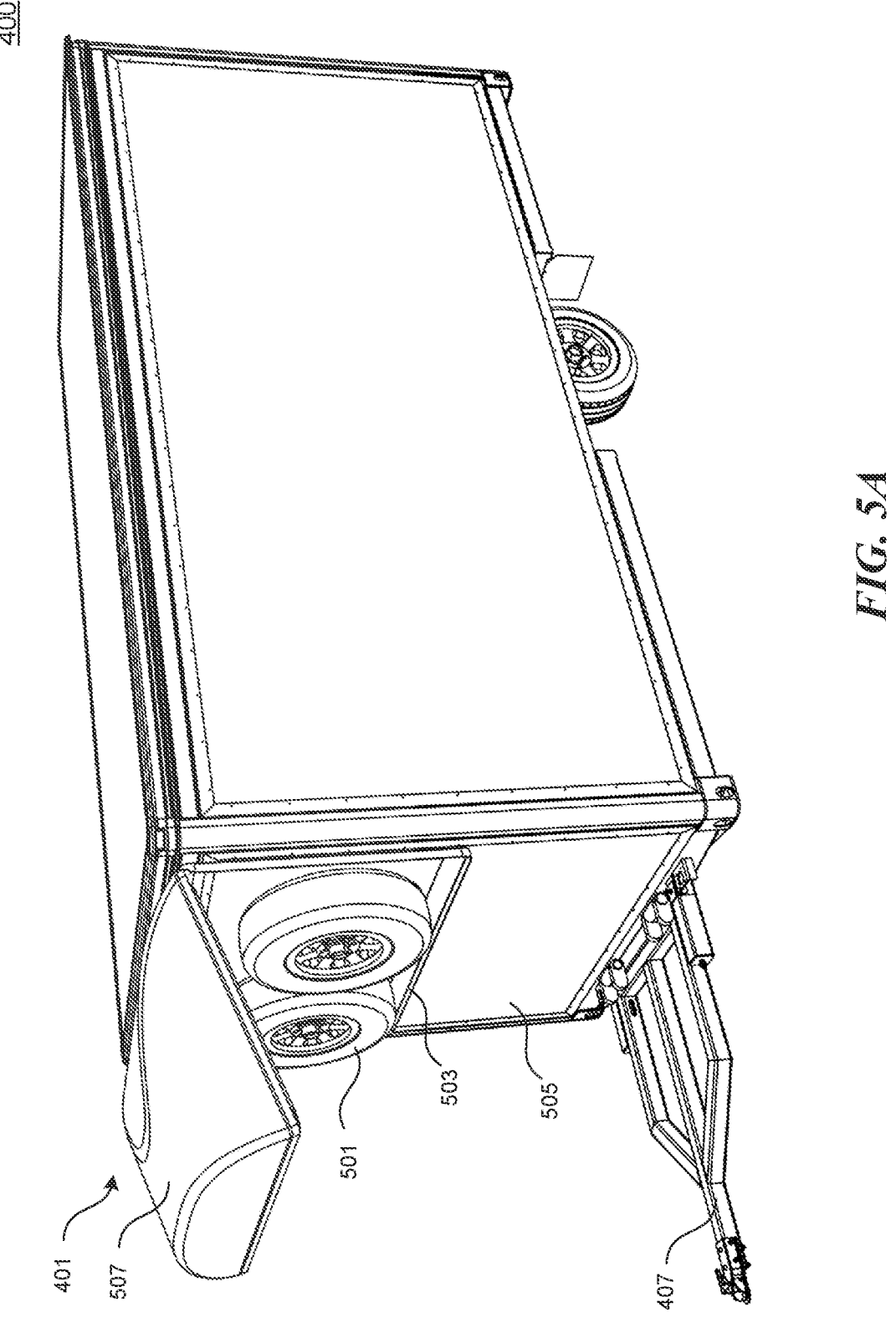

FIGS. 4 and 5A-B are isometric, schematic views of a trailer system 400 with a deflector module 401 in accordance with one or more implementations of the present disclosure. The deflector module 401 is configured to improve aerodynamic characteristics of the trailer system 400. The deflector module 401 is engineered to a specific shape such that it can enhance aero-dynamic performance of the trailer system 400 as a whole.

In some embodiments, the deflector module 401 is also configured to accommodate other components of the trailer system 400. For example, a towing bar assembly 407 can be folded (in direction R) and a portion of the towing bar assembly 407 can be stored inside the deflector module 401 when the towing bar assembly 407 is folded.

Referring to FIG. 5A, in the illustrated embodiments, the deflector module 401 can serve as a storage space (e.g., for spare tires 501, luggage, etc.). As shown in FIG. 5A, the deflector module 401 can include a frame 503 connected to a side panel 505 of the trailer system 400. The frame 503 can further connect to a cover 507 of the deflector module 401. In some embodiments, the cover 507 can rotatably couple to the frame 503. In some embodiments, the cover 507 can be connected to the frame 503 by various components such as bolts, screws, hinges, latches, recess/protrusions, etc.

FIG. 5B illustrates operations of the cover 507 of the deflector module 401. From the left to the right, the cover 507 is from an "open" position to a "closed" position. As can be seen, the spare tires 501 can be placed/hung on a holder 509 extended from the side panel 505 when the cover is at the open position. The towing bar assembly 407 can also be rotated such that a portion thereof can be located inside the deflector module 401. By this arrangement, when the cover 507 is at the closed position, the cover 507 can facilitate securing the towing bar assembly 407.

Figure 6:
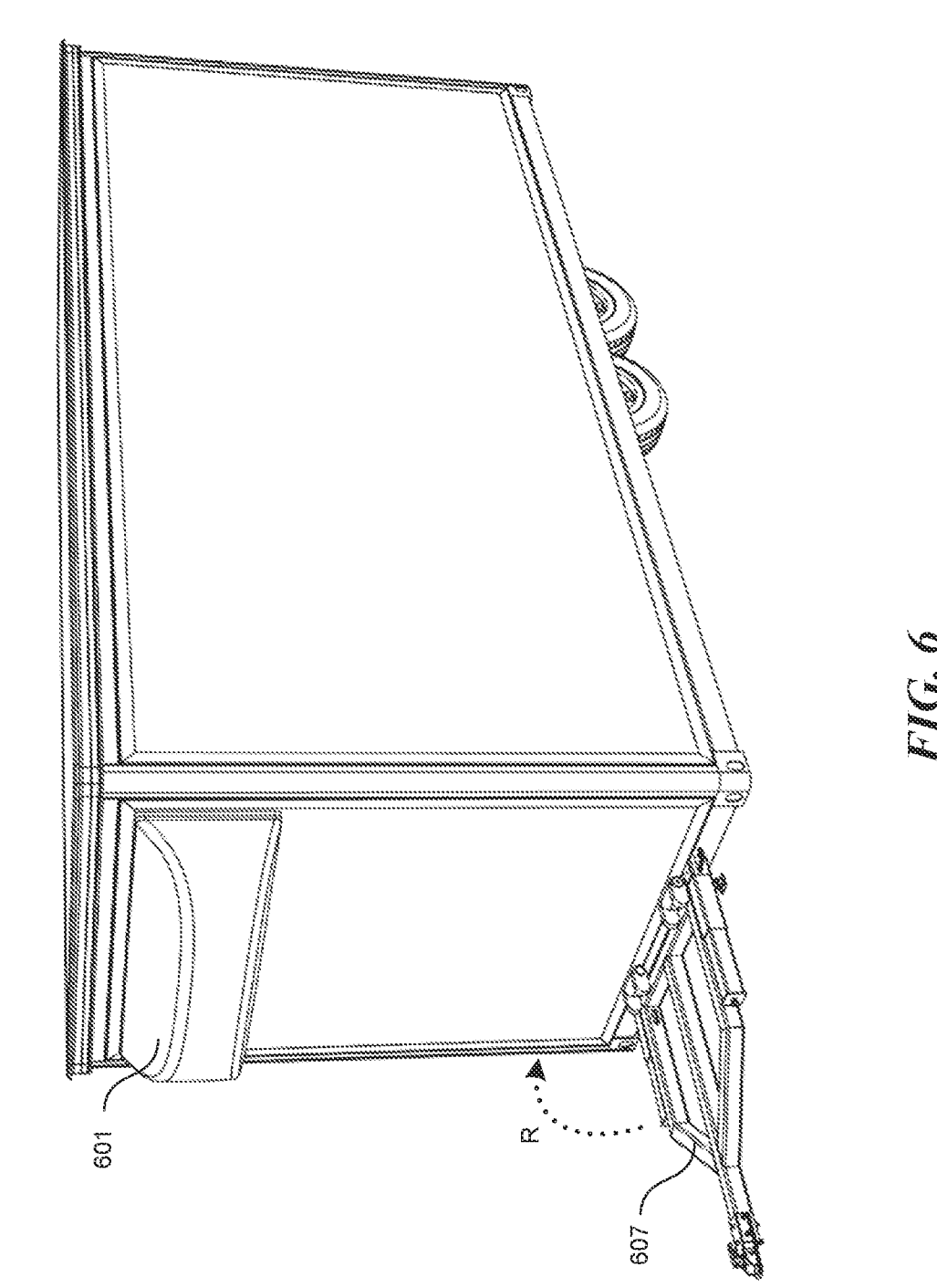
FIG. 6 is an isometric, schematic view of a trailer system with another deflector module in accordance with one or more implementations of the present disclosure.

FIG. 6 is an isometric, schematic view of a trailer system 600 with another deflector module 601 in accordance with one or more implementations of the present disclosure. Compared to the deflector module 401 shown in FIGS. 4 and 5, the deflector module 601 has a smaller size in the vertical direction. In such embodiments, when a towing bar assembly 607 rotates or folds, the deflector module 601 will not get in the way of the towing bar assembly 607. In some embodiments, there can be a locking mechanism for the deflector module 401/601 such that the stuff stored therein can be secured.

Figures 7A, 7B:
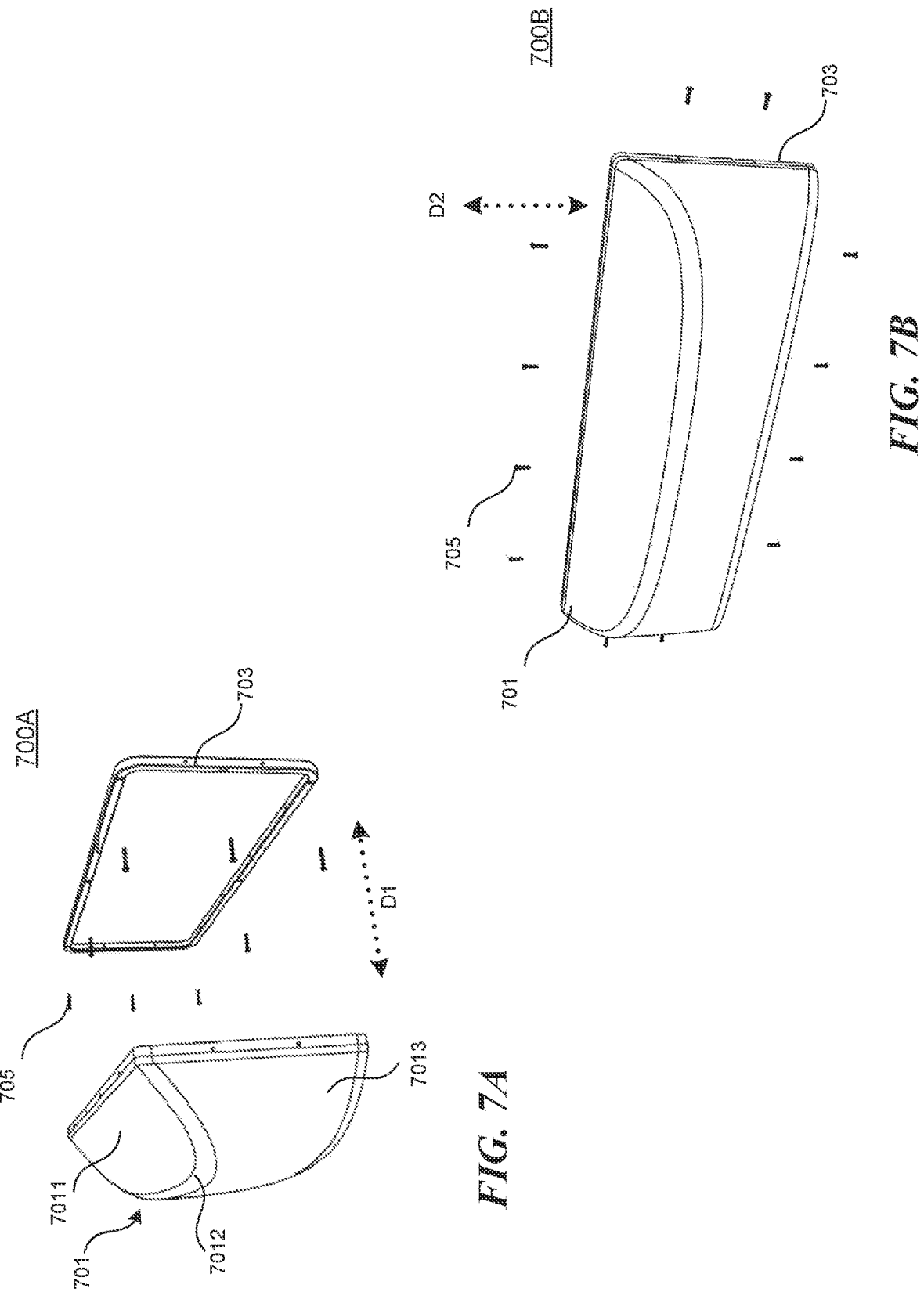
FIGS. 7A-7C are isometric, schematic views showing deflector modules in accordance with one or more implementations of the present disclosure.
Figure 7C:
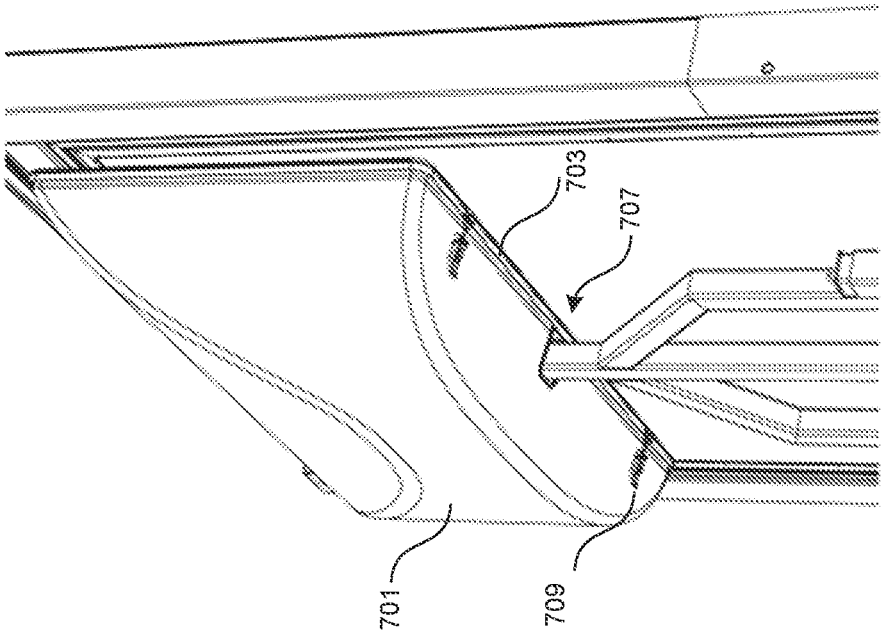

FIGS. 7A-7C are isometric, schematic views showing deflector modules 700A-C in accordance with one or more implementations of the present disclosure. In FIG. 7A, the deflector module 700A includes a cover 701 and a frame 703. In the illustrated embodiments, the cover 701 and the frame 703 can be connected by multiple bolts 705 in a direction (indicated as direction D1) generally perpendicular to a main plane of the frame 703.

In some embodiments, the cover 701 includes at least three major surfaces 7011, 7012, and 7013. Each of the major surfaces has a surface curvature different from those of the other two major surfaces.

In FIG. 7B, the deflector module 700B can also include the cover 701 and the frame 703. In the illustrated embodiments, the cover 701 and the frame 703 can be connected by multiple bolts 705 in a direction (indicated as direction D2) generally parallel to a main plane of the frame 703.

In FIG. 7C, the deflector module 700C is formed with an opening 707 are to accommodate a component of a trailer system (e.g., a towing bar) to pass through. The deflector module 700C can also include one or more locking components 709 configured to secure the cover 701 to the frame 703.

Figure 8A:
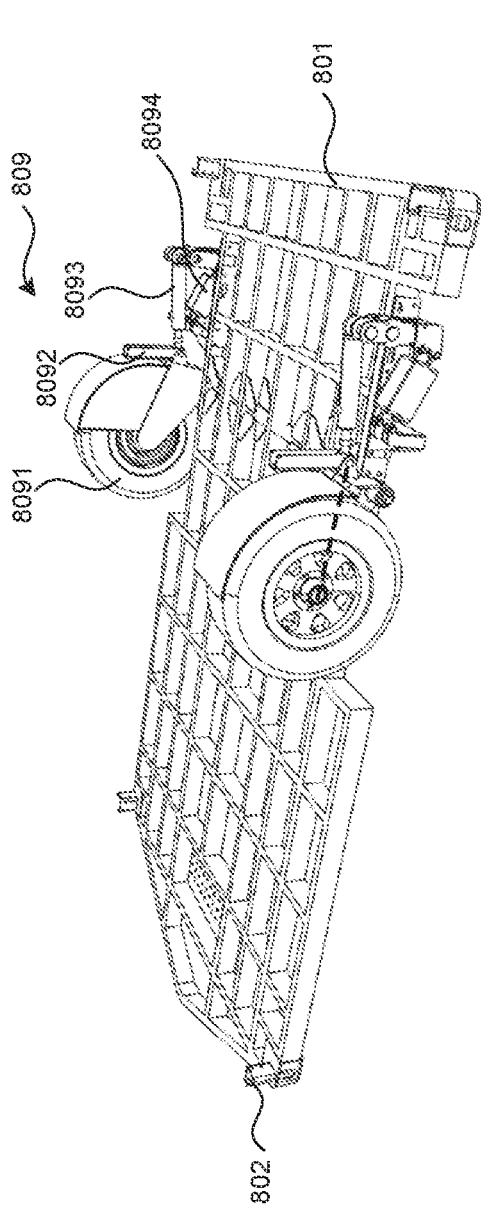
FIGS. 8A-8B are isometric, schematic views illustrating a platform structure and a wheel assembly in accordance with one or more implementations of the present disclosure.
Figure 8B:
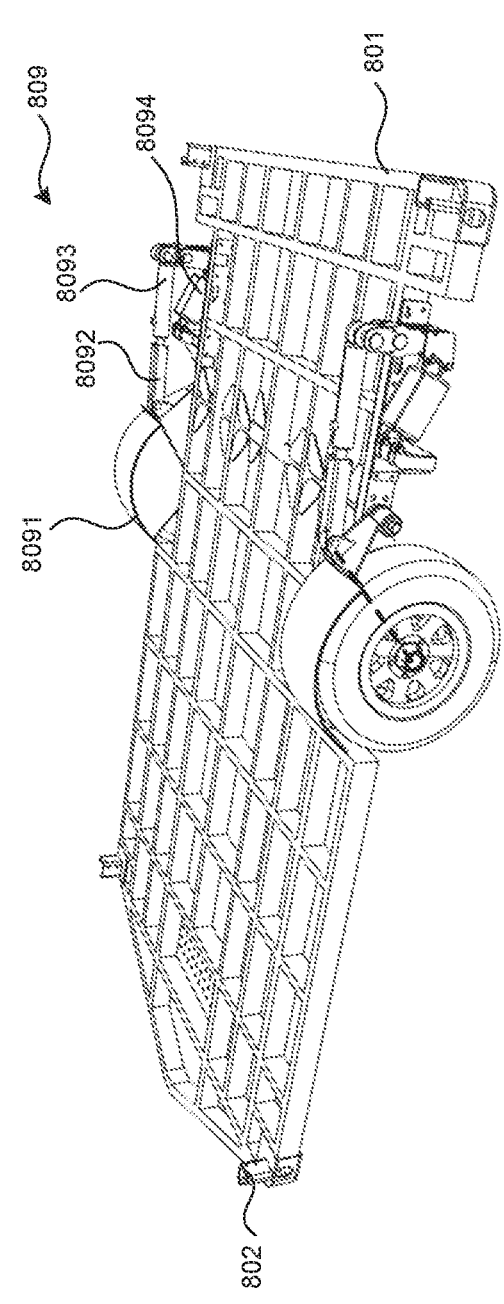

FIGS. 8A-8B are isometric, schematic views illustrating a platform structure 801 and a wheel assembly 809 in accordance with one or more implementations of the present disclosure. As shown, the platform structure 801 includes a post 802 at each corner and the post 802 is configured to insert into and connect with a corner module (e.g., the corner modules 103).

As also shown in FIGS. 8A-8B, the wheel assembly 809 includes a wheel 8091, a first linking member 8092 and a second linking member 8093. The second linking member 8093 is further connected to a hydraulic component 8094 such that the second linking member 8093 can be moved by the hydraulic component 8094. When the second linking member 8093 is moved (e.g., the second linking member 8093 includes a piston therein and the piston can extend or retreat such that the total length of the second linking member 8093 changes, which is characterized as the movement of the second linking member 8093), the wheel 8091 can be moved relatively to the first linking member 8092 (e.g., the first linking member 8092 serves as a guiding member or a track to control the movement of the wheel 8091. By the foregoing arrangement, the position of the wheel 8901 can be adjusted. In FIG. 8A, the wheel 8091 is in a "stored" position. In FIG. 8B, the wheel 8091 is in an operation position. In some embodiments, the foregoing movement can be controlled by a computing device with predetermined instructions and configuration, such that an operator can conveniently adjust the position of the wheel 8091 depending on various needs.

Figures 9A, 9B, 9C:
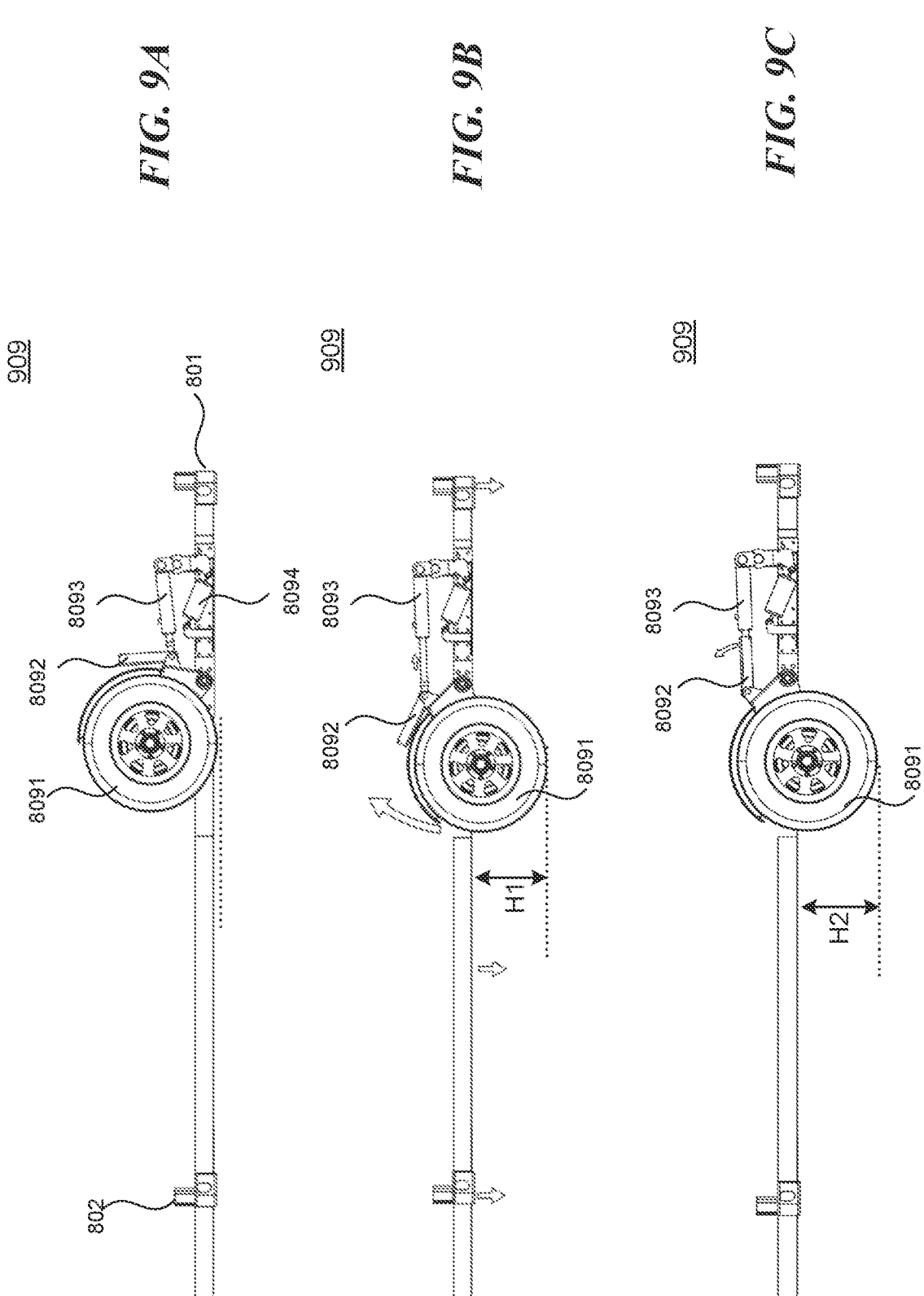
FIGS. 9A-9C are side, schematic views illustrating operations of a wheel assembly (e.g., single-wheel design) in accordance with one or more implementations of the present disclosure.

FIGS. 9A-9C are side, schematic views illustrating operations of a wheel assembly 909 (e.g., single-wheel design) in accordance with one or more implementations of the present disclosure. The wheel assembly 909 includes the wheel 8091, the first linking member 8092 and the second linking member 8093. The second linking member 8093 is further connected to the hydraulic component 8094 such that the second linking member 8093 can be moved by the hydraulic component 8094. When the second linking member 8093 is moved, the first linking member 8092 is also moved (e.g., the second linking member 8093 includes a piston therein and the piston can extend or retreat such that the total length of the second linking member 8093 changes, which is characterized as the "movement" of the second linking member 8093), so does the wheel 8091.

As can be seen in FIG. 9A, the wheel 8091 is in a stored position, where an edge of wheel 8091 is generally parallel to the platform structure 801. In other words, the wheel 8091 is completely stored in the platform structure 801. At this stage, the first linking member 8092 and the second linking member 8093 are generally perpendicular to each other (e.g., forming a right angle as shown in FIG. 9A).

In FIG. 9C, the hydraulic component 8094 can move the wheel 8091 to an operation position. In this embodiments, the height between a ground surface and the platform structure 801 is "H2." At this stage, the first linking member 8092 and the second linking member 8093 are aligned and are generally in parallel.

In FIG. 9B, when an operator wants to adjust the height, the hydraulic component 8094 can move the second linking member 8093 such that the wheel 8091 retreats toward the platform structure 801. Accordingly, the height "H1" between the ground surface and the platform structure 801 is lower than "H2." In other words, the platform structure 801 (and accordingly the trailer system) is lowered. At this stage, the first linking member 8092 and the second linking member 8093 together form an angle (e.g., an obtuse angle as shown in FIG. 9B).

FIGS. 10A-10C are side, schematic views illustrating operations of another wheel assembly 1009 (e.g., single-wheel design) in accordance with one or more implementations of the present disclosure. Similar to the embodiments discussed in FIGS. 9A-9C, the wheel assembly 1009 includes a wheel 10091, a first linking member 10902 and a second linking member 10093. The second linking member 10093 is further connected to a hydraulic component such that the second linking member 10093 can be moved by the hydraulic component. When the second linking member 10093 is moved, the first linking member 10902 is also moved (e.g., the second linking member 10093 includes a piston therein and the piston can extend or retreat such that the total length of the second linking member 10093 changes, which is characterized as the "movement" of the second linking member 10093), so does the wheel 8091.

As can be seen in FIG. 10A, the wheel 10091 is in a stored position. As shown, the wheel 10091 is completely stored in a platform structure. At this stage, the first linking member 10092 and the second linking member 10093 together form an acute angle.

In FIG. 10C, the hydraulic component can move the wheel 10091 to an operation position. In this embodiments, the height between a ground surface and the platform structure is "H2." At this stage, the first linking member 10092 and the second linking member 10093 are aligned and are generally in parallel.

In FIG. 10B, when an operator wants to adjust the height, the hydraulic component can move the second linking member 10093 such that the wheel 1001 retreats toward the platform structure. Accordingly, the height "H1" between the ground surface and the platform structure 801 is lower than "H2." In other words, the platform structure (and accordingly the trailer system) is lowered. At this stage, the first linking member 1092 and the second linking member 10093 together form an obtuse angle as shown in FIG. 10B.

Figures 11A, 11B:
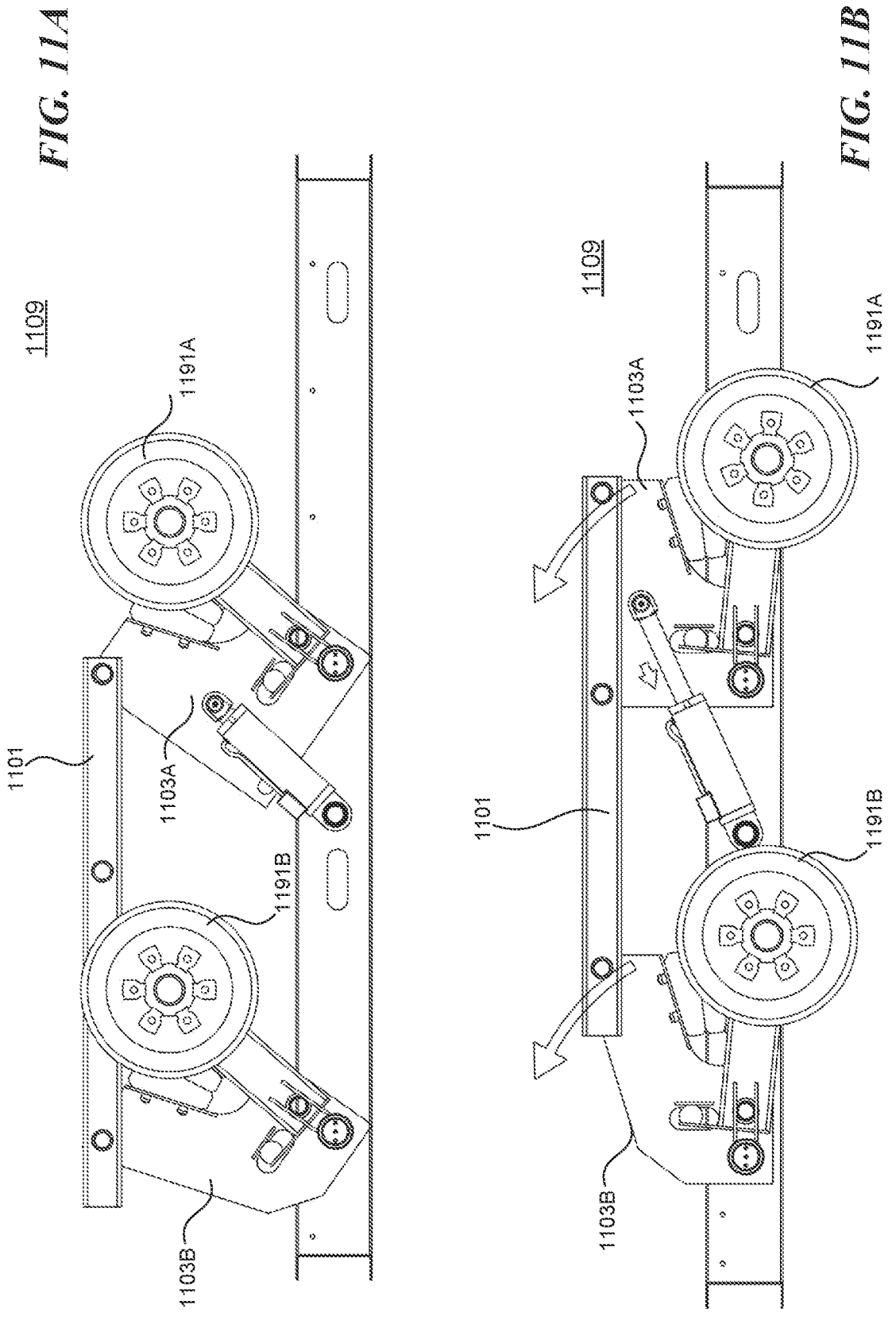
FIGS. 11A-11B are side, schematic views illustrating operations of another wheel assembly (e.g., double-wheel design) in accordance with one or more implementations of the present disclosure.

FIGS. 11A-11B are side, schematic views illustrating operations of a wheel assembly 1109 (e.g., double-wheel design) in accordance with one or more implementations of the present disclosure. Compared to the embodiments described in FIGS. 10A-10C, the wheel assembly 1109 has a double-wheel design and can be moved by mechanisms similar to those described above with reference to FIGS. 10A-10C. The difference is that the wheel assembly 1109 includes an alignment member 1101 configured to coordinate the movement of a first wheel 1191A and as second wheel 1191B of the wheel assembly 1109. The wheel assembly 1109 includes a first bracket 1103A connected to the first wheel 1191A and operably/rotatably connected to the alignment member 1101. The wheel assembly 1109 also includes a second bracket 1103B connected to the second wheel 1191B and operably/rotatably connected to the alignment member 1101. By the foregoing configuration, the alignment member 1101 is configured to align or guide the movement of the first and second wheels 1191A, 1191B such that they can generally be aligned horizontally.

Figures 12A, 12B, 12C:
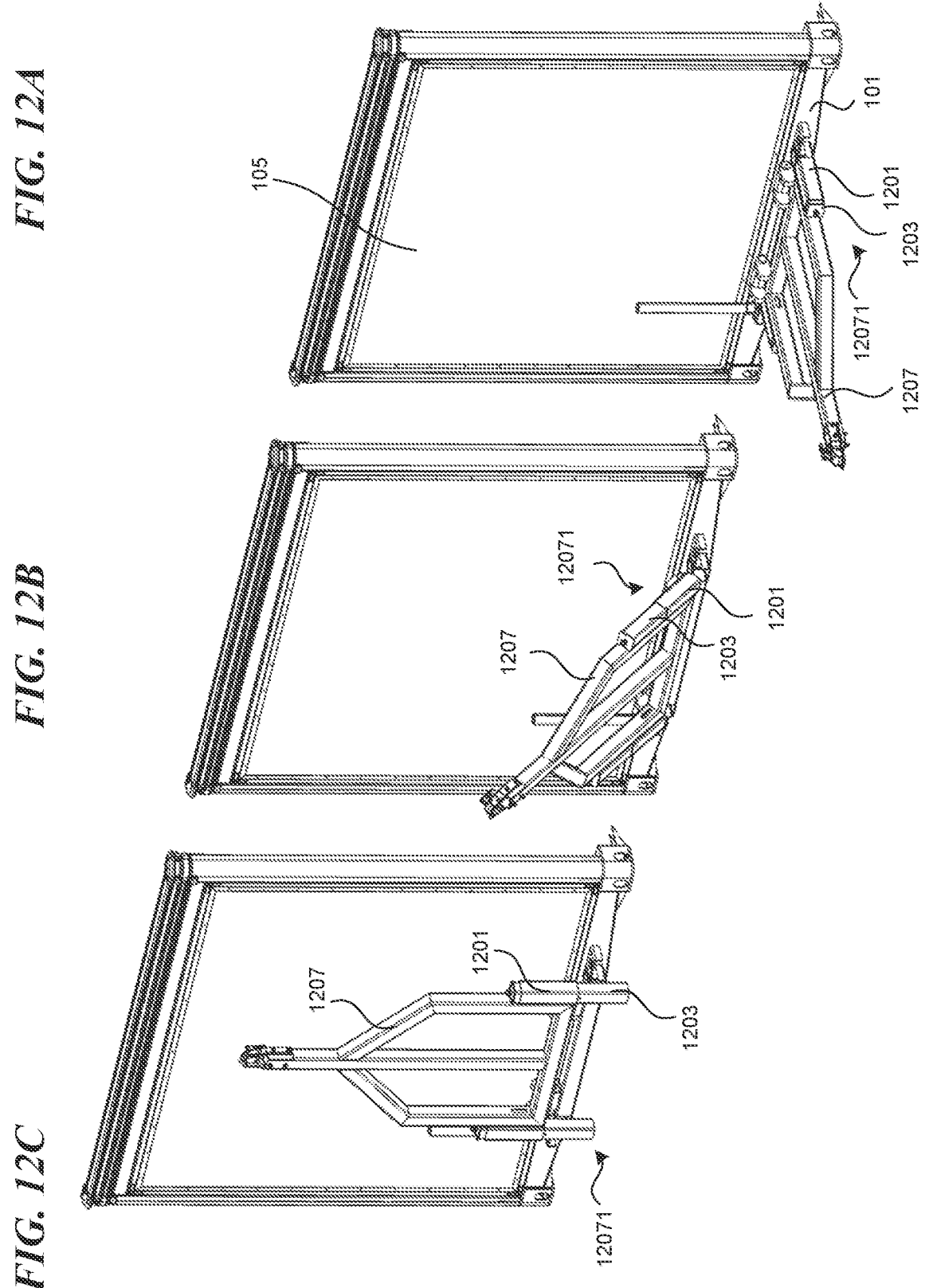
FIGS. 12A-12C are isometric, schematic views illustrating operations of a towing assembly in accordance with one or more implementations of the present disclosure.

FIGS. 12A-12C are isometric, schematic views illustrating operations of a towing assembly 1207 in accordance with one or more implementations of the present disclosure. The towing assembly 1207 can be adjusted from a towing position (FIG. 12A), through a transition position (FIG. 12B), and to a stored position (FIG. 12C). The towing assembly 1207 is connected to a platform structure (e.g., the platform structure 101) and in configured to tow the platform structure. The towing assembly 1207 includes a security mechanism 12071, which includes a sleeve component 1201 and an elongated member 1203.

When the towing assembly 1207 is at the towing position (FIG. 12A), the elongated member 1203 passes through the sleeve component 1201 and extends into the platform structure 101. By this arrangement, the elongated member 1203 and sleeve component 1201 together can prevent the towing assembly 1207 from rotating to the transition position (FIG. 12B).

When an operator wants to adjust the towing assembly 1207 to the stored position (FIG. 12C), the operator can first pull the elongated member 1203 away from the platform structure 101. Then the operator can rotate the towing assembly 1207 to the transition position (FIG. 12B), without the prevention or hinderance from the elongated member 1203. The operator can further rotate the towing assembly 1207 to the stored position (FIG. 12C), where the towing assembly 1207 is generally perpendicular to the platform structure 101 (while generally perpendicular to a panel module (e.g., the panel module 105) carried by the platform structure 101.

To secure the towing assembly 1207, as shown in FIG. 12C, the operator can drop or more the elongated member 1203 toward the sleeve component 1201, such that the elongated member 1203 extends outside of the sleeve component 1201. In this configuration, the portion of the elongated member 1203 that extends external to the sleeve component 1201 can effectively present the towing assembly 1207 from rotating back to the transition position (FIG. 12B).

Figure 13:
FIGS. 13 and 14 are side, schematic views illustrating operations of a door assembly in accordance with one or more implementations of the present disclosure.
Figure 14:
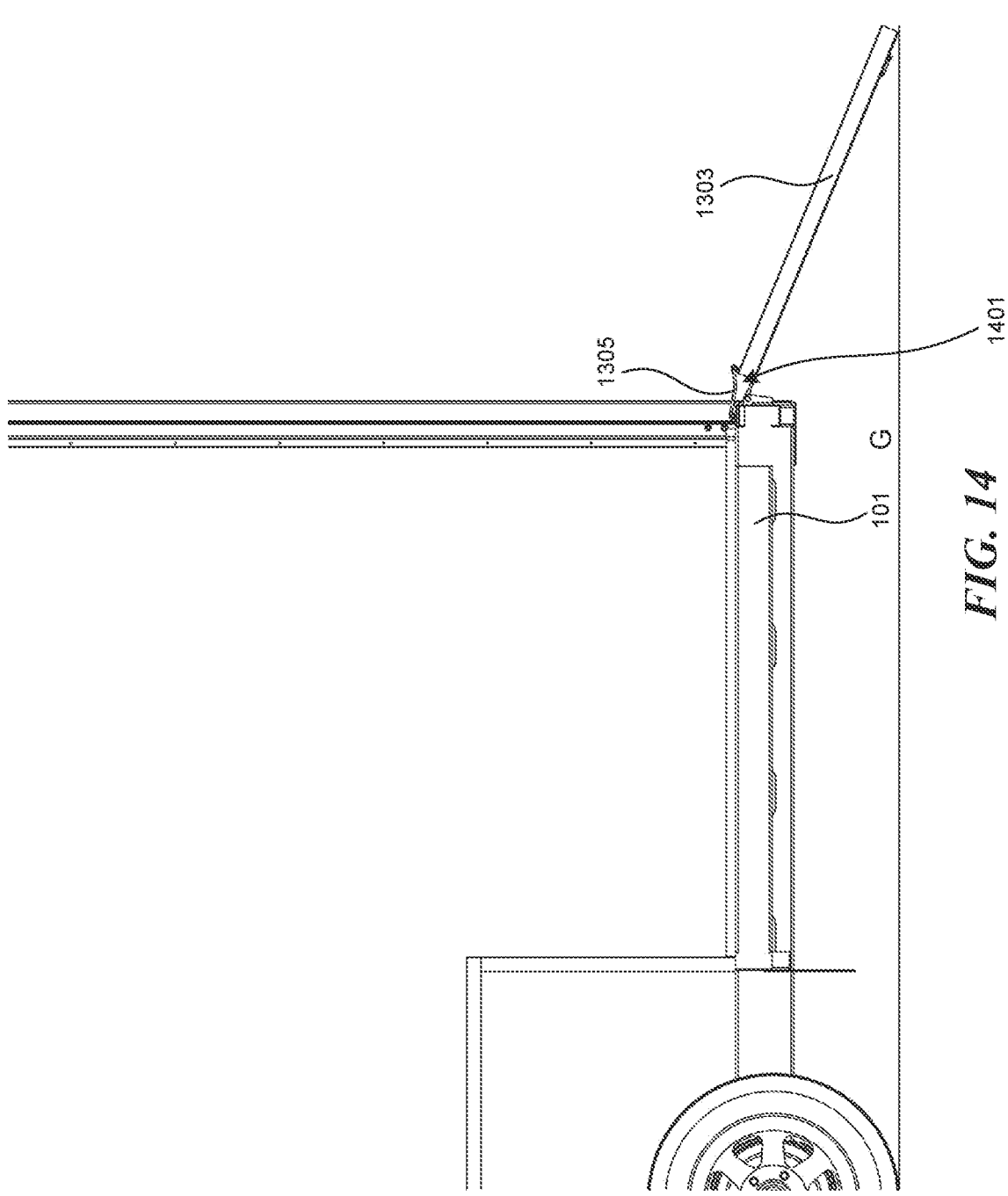

FIGS. 13 and 14 are side, schematic views illustrating operations of a door assembly 1301 in accordance with one or more implementations of the present disclosure. The door assembly 1301 includes a door 1303 and a support connector 1305. The door 1303 is pivotally connected to a platform structure (e.g., the platform structure 101) via the support connector.

Referring to FIG. 13, when the door 1303 is in a closed position (indicated as "CP" in FIG. 13), the support connector 1305 holds the door 1303 such that it does not move to an open position (indicated as "OP" in FIG. 13). When an operator wants to open the door 1303, the operator can first unlock the support connector 1305, such that it can move in direction T, which enables the door 1303 rotates to open.

Referring to FIG. 14, when the door 1303 is in an open position, one end of the door 1303 touches a ground surface G and the support connector 1305 forms a flat surface to cover a gap 1401 formed between the door 1303 and the platform structure 101. The flat surface enables a smooth, easy access for passenger access and/or cargo movement.

Figure 15A:
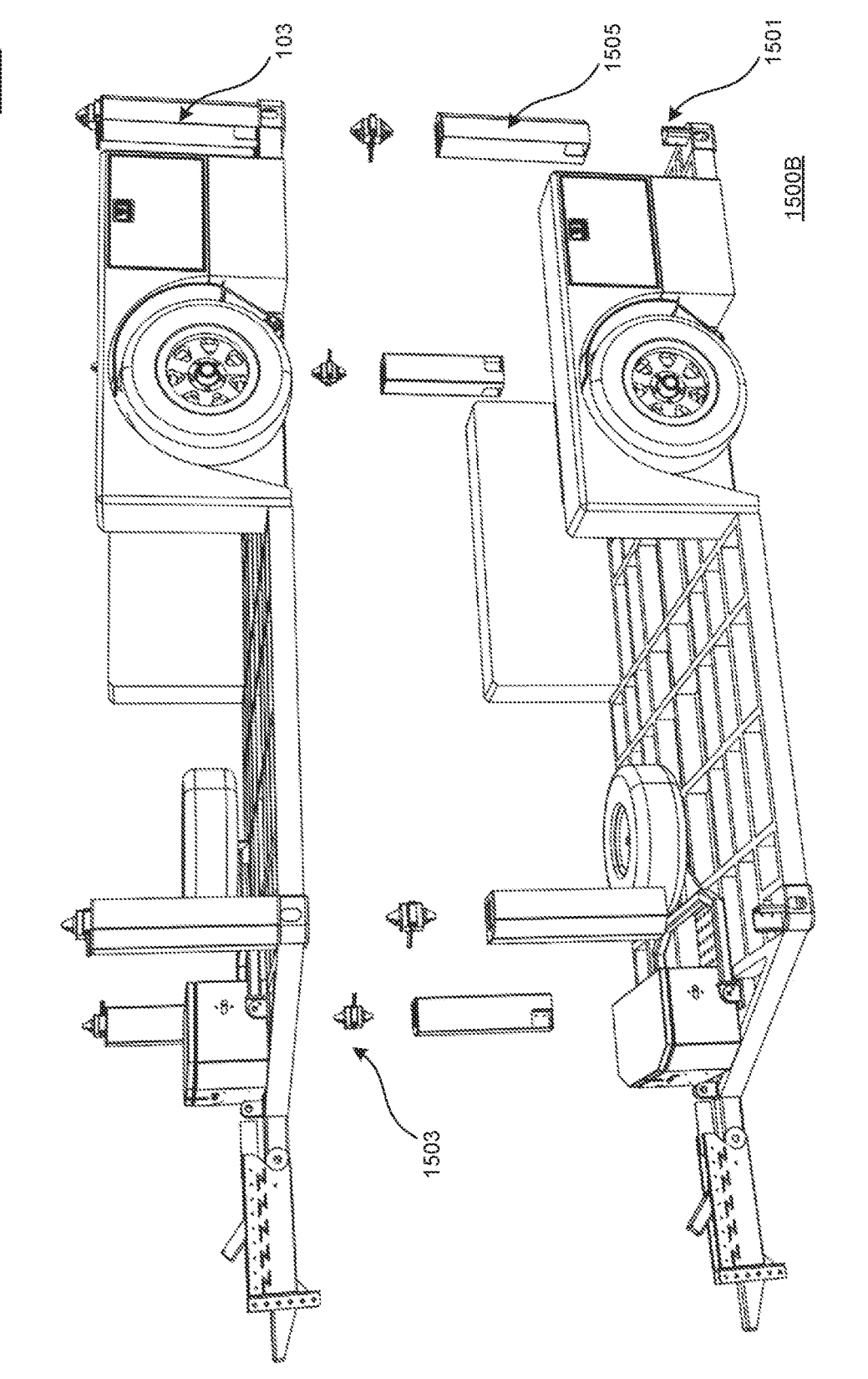
FIG. 15A is an isometric, schematic view illustrating operations of stacking a trailer system in accordance with one or more implementations of the present disclosure.

FIG. 15A is an isometric, schematic view illustrating operations of stacking trailer systems 1500A and 1500B in accordance with one or more implementations of the present disclosure. Each of the trailer systems 1500A, 1500B includes a post 1501 and a lower potion 1505 of a corner module (e.g., corner module 103) at each corner. An insert connector 1503 is configured to enable the stacking of the trailer systems 1500A, 1500B.

More particularly, each of the corner modules 103 can be formed with an upper recess 1033 and a lower recess 1034 (see FIG. 3). The upper recess 1033 and the lower recess 1034 are each configured to accommodate one end of the insert connector 1503. By this arrangement, the trailer systems 1500A, 1500B can be stacked. In some embodiments, the lower recess 1034 can be formed with the platform structure 101.

Figure 15B:
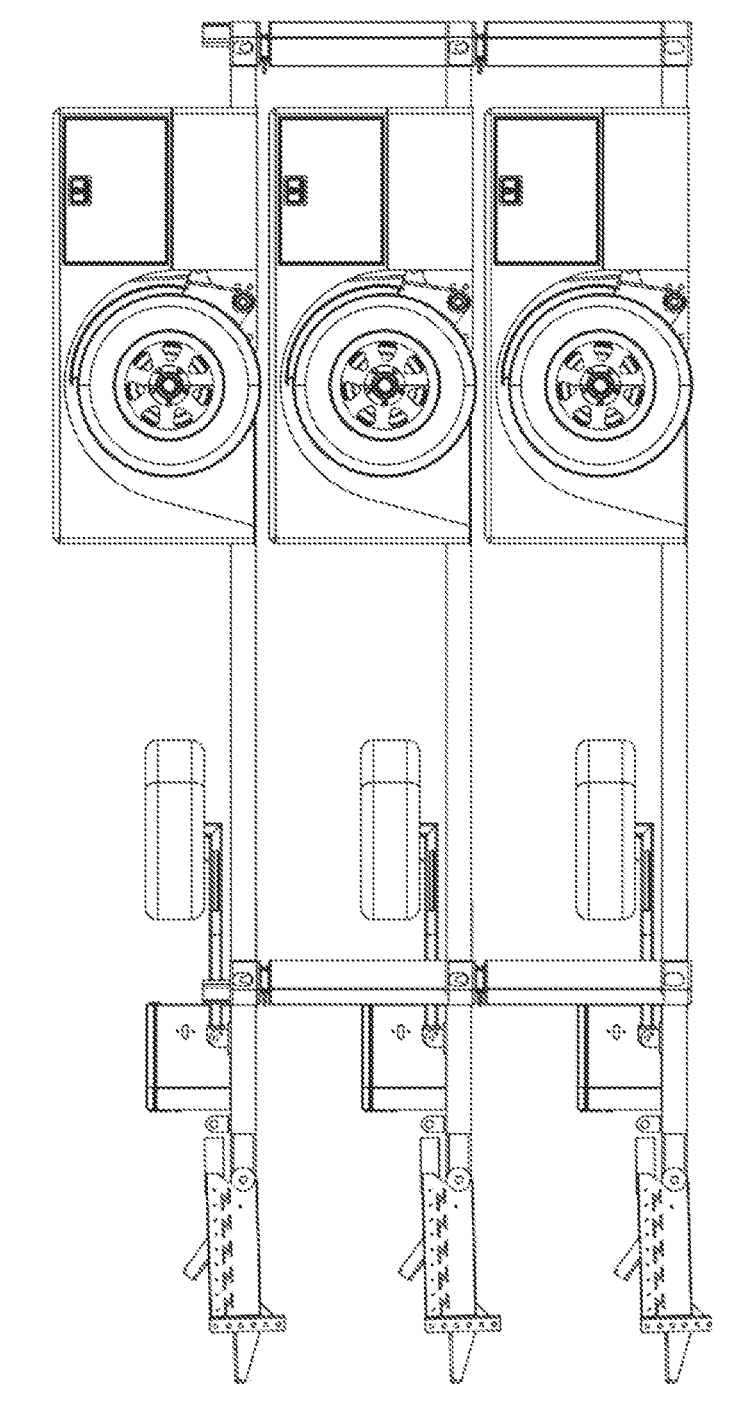
FIG. 15B is a side, schematic view illustrating a stacked trailer system in accordance with one or more implementations of the present disclosure.

FIG. 15B is a side, schematic view illustrating a stacked trailer system 1500 in accordance with one or more implementations of the present disclosure. As shown, the stacked trailer system 1500 includes three trailer systems. In the illustrated embodiments, the stacked trailer system 1500 can fit in a standard shipping container (e.g., 8'×8.5'×20'). In other embodiments, the stacked trailer system 1500 can include other number of trailer systems stacked.

FIG. 16 is a flowchart of a method for stacking a trailer system in accordance with one or more implementations of the present disclosure. The method 1600 includes, at block 1601, positioning a first corner module on a first post of a first trailer system. At block 1603, the method 1600 continues by aligning a first end of an insert connector with an upper recess of the first corner module.

At block 1605, the method 1600 continues by positioning the first end of then insert connector in the upper recess of the first corner module. At block 1607, the method 1600 continues by positioning a second corner module on a second post of a second trailer system. The second trailer system includes a lower access formed on a bottom surface of the second trailer system.

At block 1607, the method 1600 continues by aligning a second end of the insert connector with the lower recess of the second trailer system. At block 1609, the method 1600 continues by positioning the second end of then insert connector in the lower recess of the second trailer system.

FIG. 17 is a flowchart of a method for installing a deflector module in accordance with one or more implementations of the present disclosure. The method 1700 includes, at block 1701, positioning a frame portion of a deflector module on a surface of a panel module of a trailer system. At block 1703, the method 1700 continues by aligning a cover portion of the deflector module with the frame portion.

At block 1705, the method 1700 continues by securing the cover portion of the deflector module with the frame portion in a first direction generally perpendicular to the surface or in a second direction generally parallel to the surface.

Figure 18:
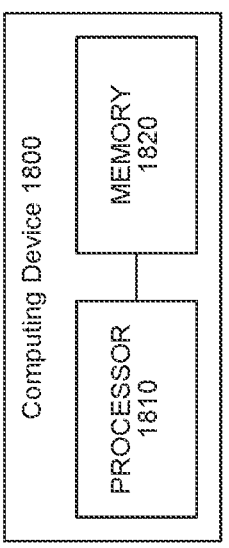
FIG. 18 is a block diagram a computing device that can be used to implement the methods disclosed herein in accordance with one or more implementations of the present disclosure.

FIG. 18 is a schematic block diagram of a computing device 1800 (e.g., which can implement the methods discussed herein) in accordance with one or more implementations of the present disclosure. As shown, the computing device 1800 includes a processing unit 1810 (e.g., a DSP, a CPU, a GPU, etc.) and a memory 1820. The processing unit 1810 can be configured to implement instructions that correspond to the methods discussed herein and/or other aspects of the implementations described above. It should be understood that the processor 1810 in the implementations of this technology may be an integrated circuit chip and has a signal processing capability. During implementation, the steps in the foregoing method may be implemented by using an integrated logic circuit of hardware in the processor 1810 or an instruction in the form of software. The processor 1810 may be a general-purpose processor, a digital signal processor (DSP), an application specific integrated circuit (ASIC), a field programmable gate array (FPGA) or another programmable logic device, a discrete gate or transistor logic device, and a discrete hardware component. The methods, steps, and logic block diagrams disclosed in the implementations of this technology may be implemented or performed. The general-purpose processor 1810 may be a microprocessor, or the processor 1810 may be alternatively any conventional processor or the like. The steps in the methods disclosed with reference to the implementations of this technology may be directly performed or completed by a decoding processor implemented as hardware or performed or completed by using a combination of hardware and software modules in a decoding processor. The software module may be located at a random-access memory, a flash memory, a read-only memory, a programmable read-only memory or an electrically erasable programmable memory, a register, or another mature storage medium in this field. The storage medium is located at a memory 1820, and the processor 1810 reads information in the memory 1820 and completes the steps in the foregoing methods in combination with the hardware thereof.

It may be understood that the memory 1820 in the implementations of this technology may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random-access memory (RAM) and is used as an external cache. For exemplary rather than limitative description, many forms of RAMs can be used, and are, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchronous link dynamic random-access memory (SLDRAM), and a direct Rambus random-access memory (DR RAM). It should be noted that the memories in the systems and methods described herein are intended to include, but are not limited to, these memories and memories of any other suitable type. In some embodiments, the memory may be a non-transitory computer-readable storage medium that stores instructions capable of execution by a processor.

Figure 19A:
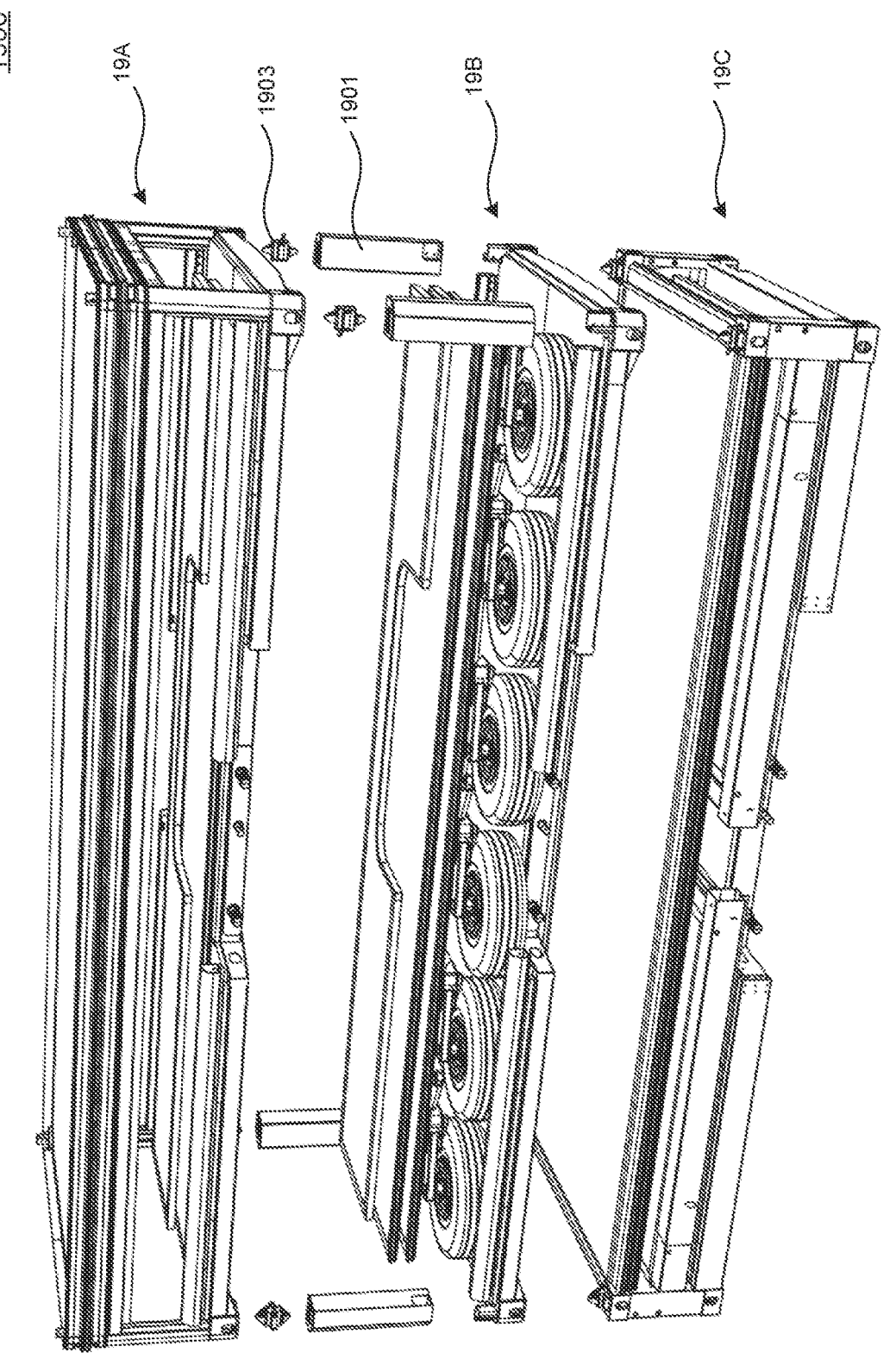
FIGS. 19A and 19B are schematic views illustrating stacking and storing of the trailer system in accordance with one or more implementations of the present disclosure.
Figure 19B:
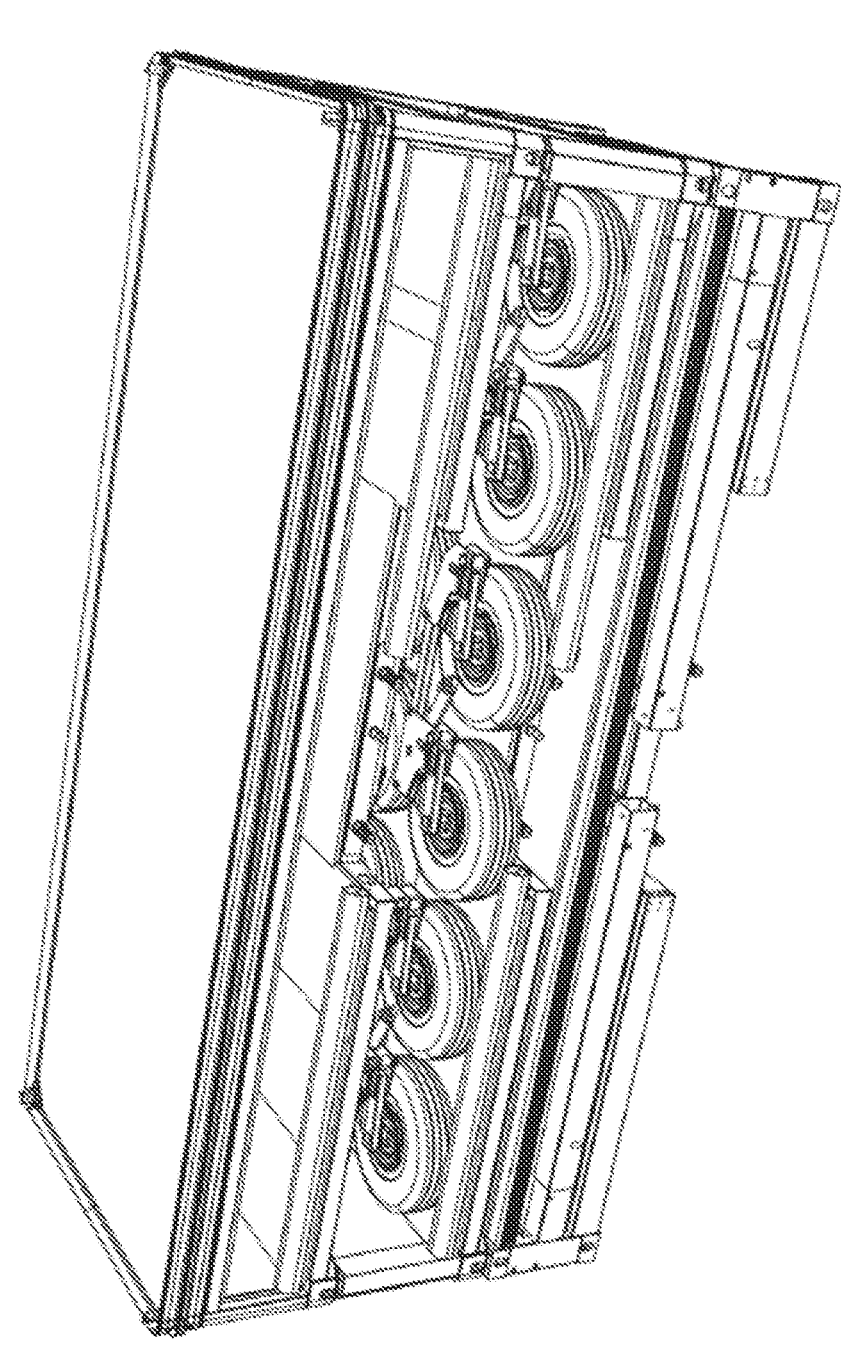

FIGS. 19A and 19B are schematic views illustrating stacking and storing of the trailer system in accordance with one or more implementations of the present disclosure. In the Illustrated embodiments of FIG. 19A, a stacked trailer set 1900 includes multiple (e.g., three) individual trailer systems and is sized to fit in a shipping container. As shown, the stacked trailer set 1900 includes a first trailer system 19A, a second trailer system 19B, and a third trailer system 19C. The trailer systems 19A-C are stacked via multiple lower portions 1901 of corner modules (e.g., the corner module 103) and multiple insert connectors 1903 (e.g., the insert connector 1503). In the illustrated embodiments, the first trailer system 19A and the second trailer system 19B are of the same type (e.g., having the same platform structure, see e.g., FIG. 21A). The third trailer system 19C can be another type (e.g., having a platform structure shown in FIG. 22B).

In FIG. 19B, the stacked trailer set 1900 are stacked and the components (wheels, panels, etc.) of the first/second/third trailer systems 19A-C can be stored space-efficiently. By this configuration, the stacked trailer set 1900 is convenient, easy to be transported and is ready to be shipped by a shipping container.

Figures 20A, 20B, 20C:
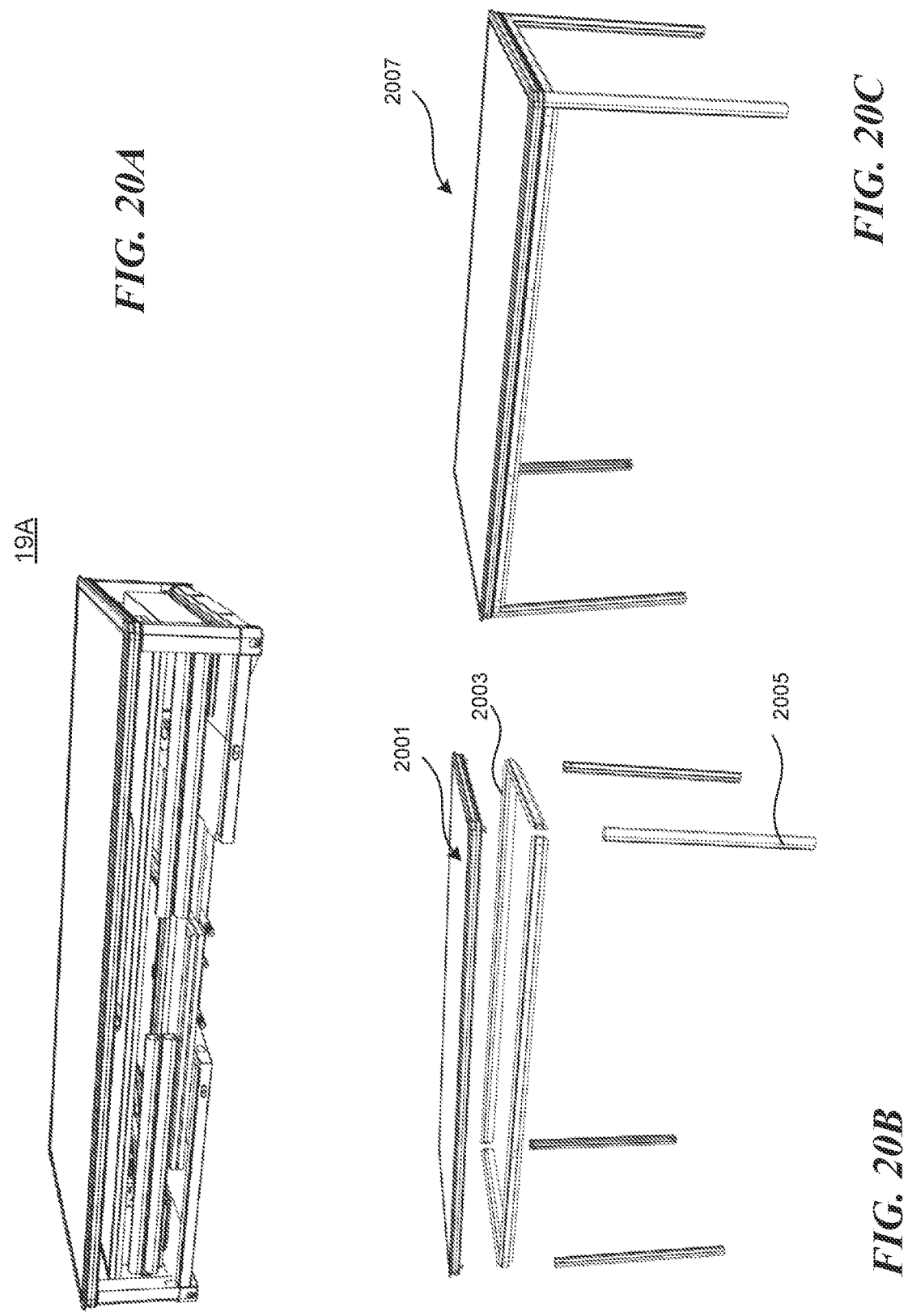
FIGS. 20A-20C are schematic views illustrating assembling of the trailer system in accordance with one or more implementations of the present disclosure.

FIGS. 20A-20C are schematic views illustrating assembling of the trailer system in accordance with one or more implementations of the present disclosure. As shown in FIG. 20A, multiple components can be stored in the first trailer system 19A, such as a panel 2001, a connecting frame 2003, and a connecting portion 2005 (e.g., the upper portion 1032 shown in FIG. 3). As shown in FIG. 20B, the panel 2001, the connecting frame 2003, and the connecting portion 2005 can be assembled to form a top portion 2007 of a trailer system. The assembled top portion 2007 is shown in FIG. 20C.

Figure 21A:
Figure 21C:
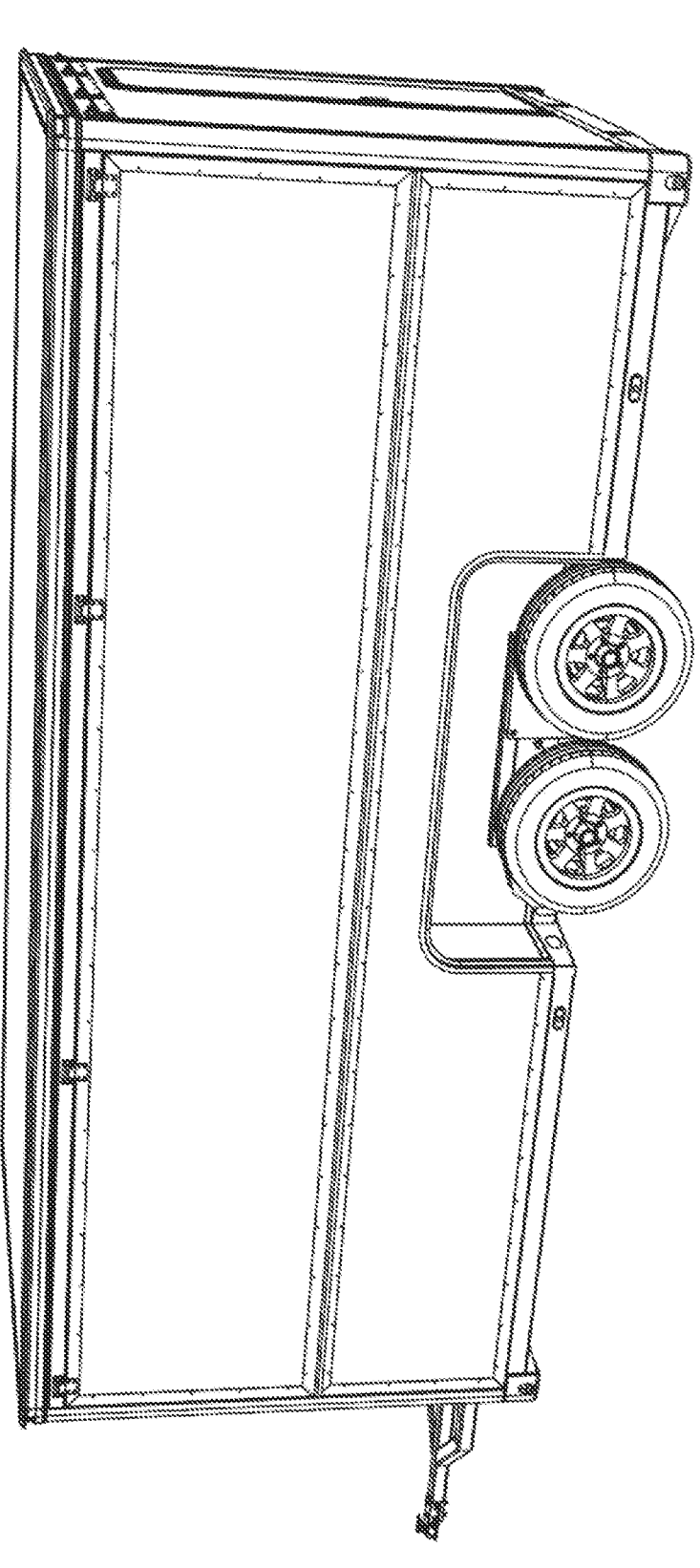

FIGS. 21A-21C are schematic views illustrating assembling of the trailer system in accordance with one or more implementations of the present disclosure. FIG. 21A illustrates a platform structure 2100A of the first/second trailer systems 19A-B. As shown in FIG. 21A, the platform structure 2100A can include a base 2101, a towing bar assembly 2101, and a wheel assembly 2103. As shown in FIG. 21B, the platform structure 2100A can be connected with the assembled top portion 2007 (from FIG. 21A) and multiple surrounding panels 2101 (showed as an exploded structure 2100B). In some embodiments, the surrounding panels 2105 can be stored in the same shipping container as the stacked trailer set 1900. In some embodiments, the surrounding panels 2105 can be stored in a separate container. FIG. 21C shows an assembled trailer system 2100C (e.g., from the stacked first/second trailer systems 19A-B).

Figures 22A, 22B:
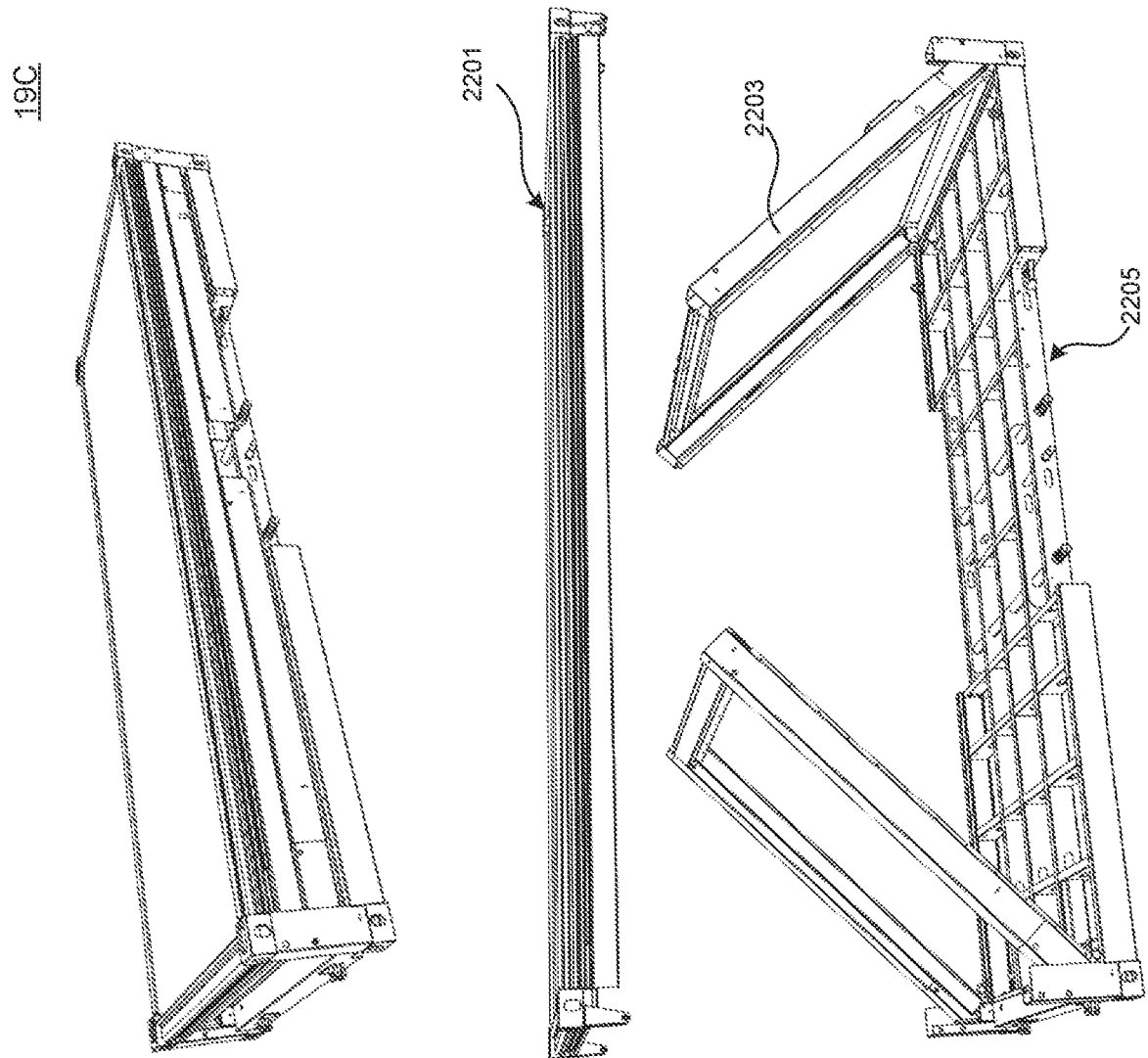
FIGS. 22A-22E are schematic views illustrating assembling of the trailer system in accordance with one or more implementations of the present disclosure.
Figure 22C:
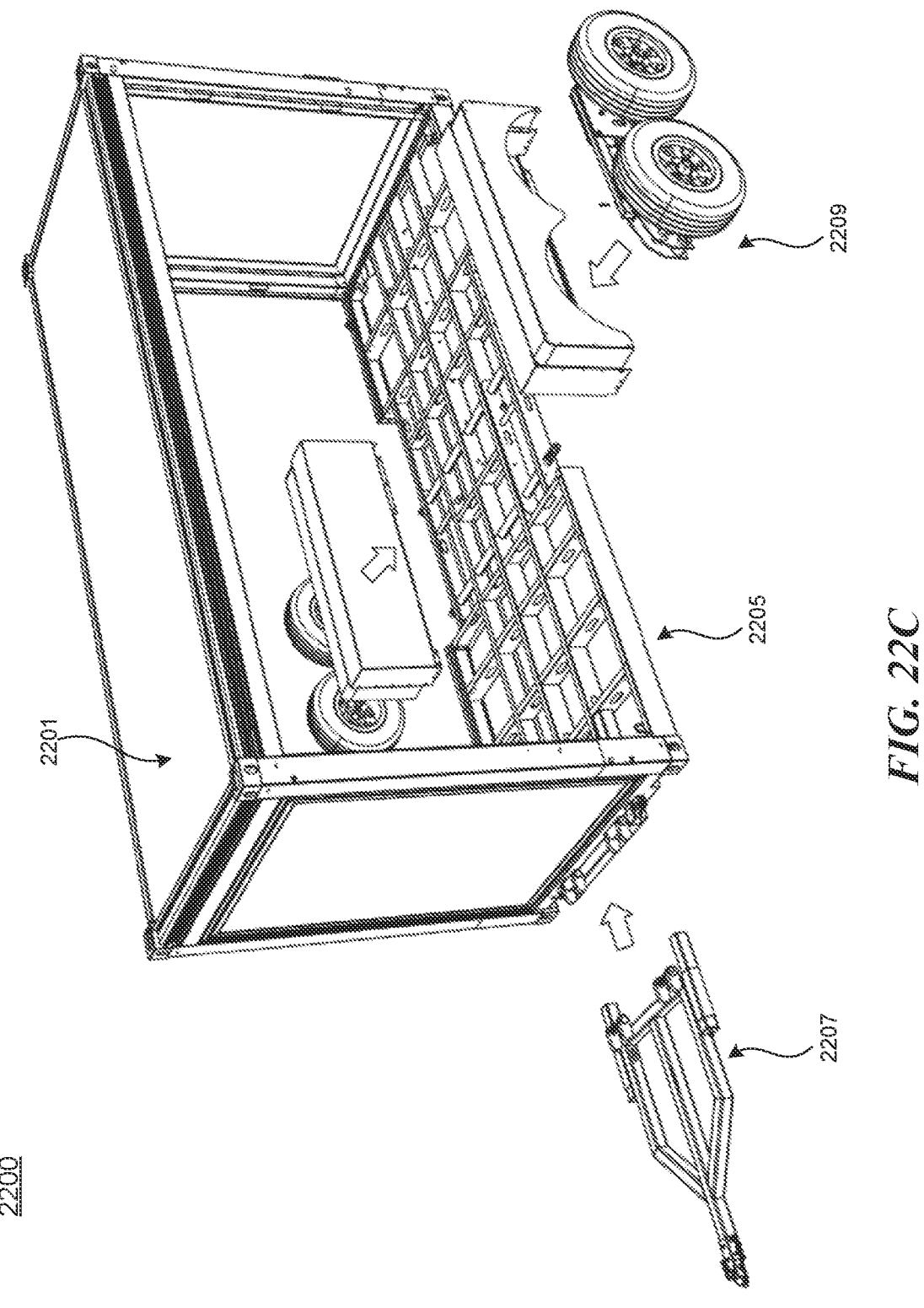

FIGS. 22A-22E are schematic views illustrating assembling of the trailer system in accordance with one or more implementations of the present disclosure. As shown in FIG. 22A, multiple components can be stored in the third trailer system 19C, such as a top pan 2201, a folding frame 2203, and a bottom structure 2205. As shown in FIG. 22B, the folding frame 2203 can be rotated to extend from the bottom structure 2205. The rotated folding frame 2203 can then support the top panel 2001, as shown in FIG. 22C.

Figure 22D:
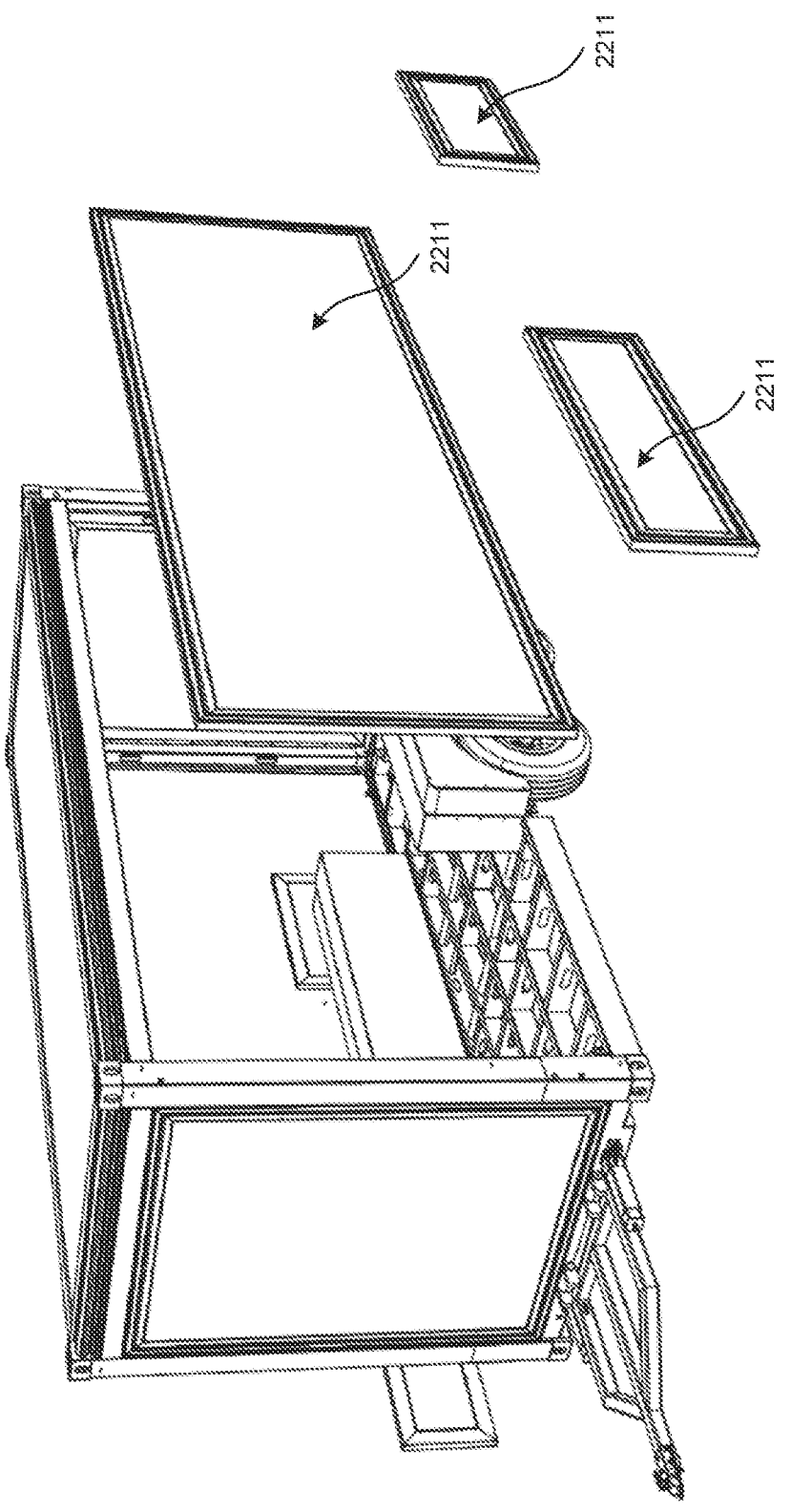
Figure 22E:
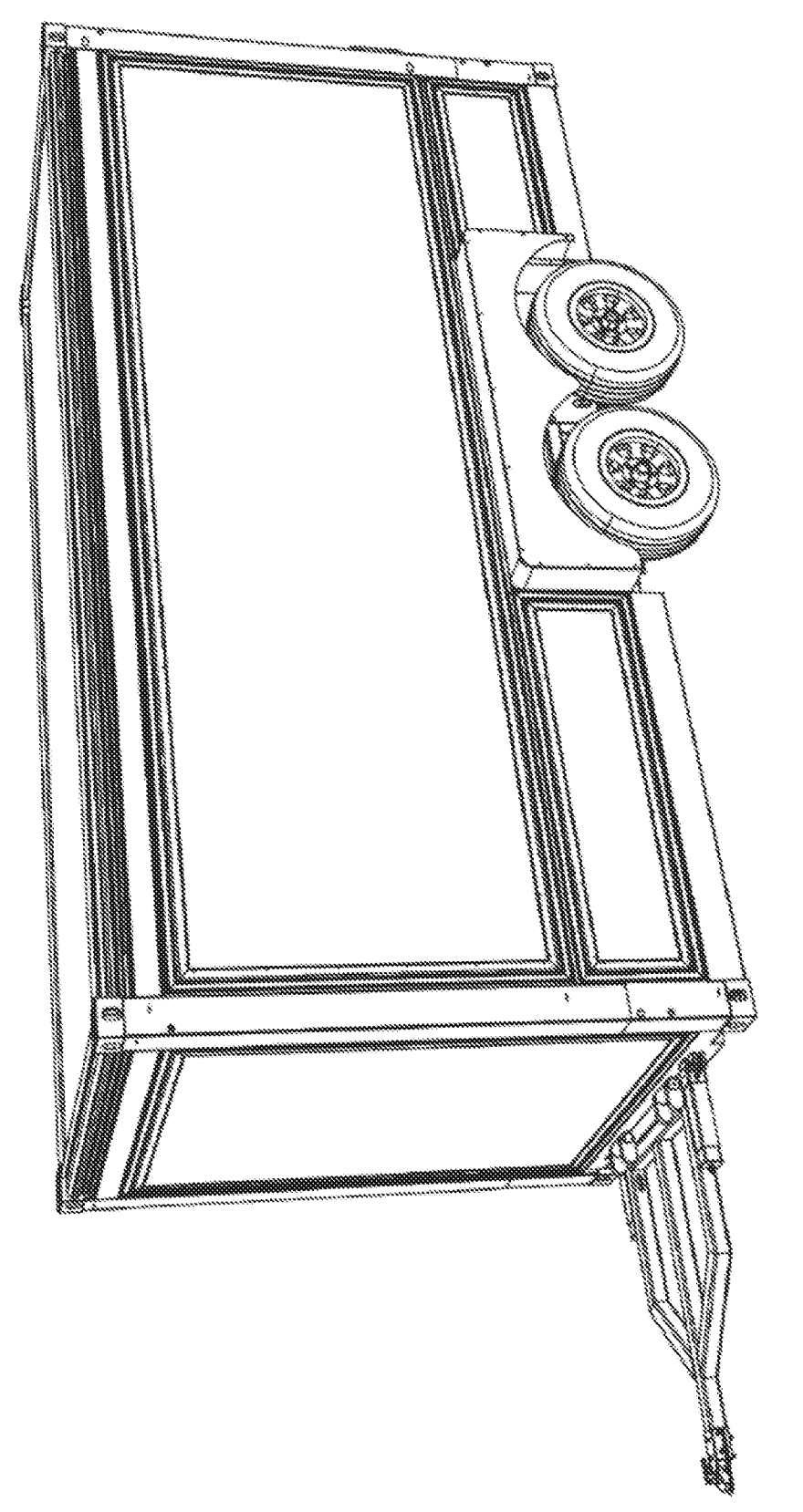

As shown in FIG. 22C, the bottom frame 2205 can be connected with other components such as a towing bar assembly 2207 and a wheel assembly 2209 (e.g., stored in the second trailer system 19B) so as to form a trailer system 2200. In FIG. 22D, multiple panels 2211 (e.g., with different sizes) can be installed to the trailer system 2200. In some embodiments, the panels 2211 can be stored in the same shipping container as the stacked trailer set 1900. In some embodiments, the panels 2211 can be stored in a separate container. FIG. 22E shows an assembled trailer system 2200 (e.g., from the third trailer system 19C).

Figure 23A:
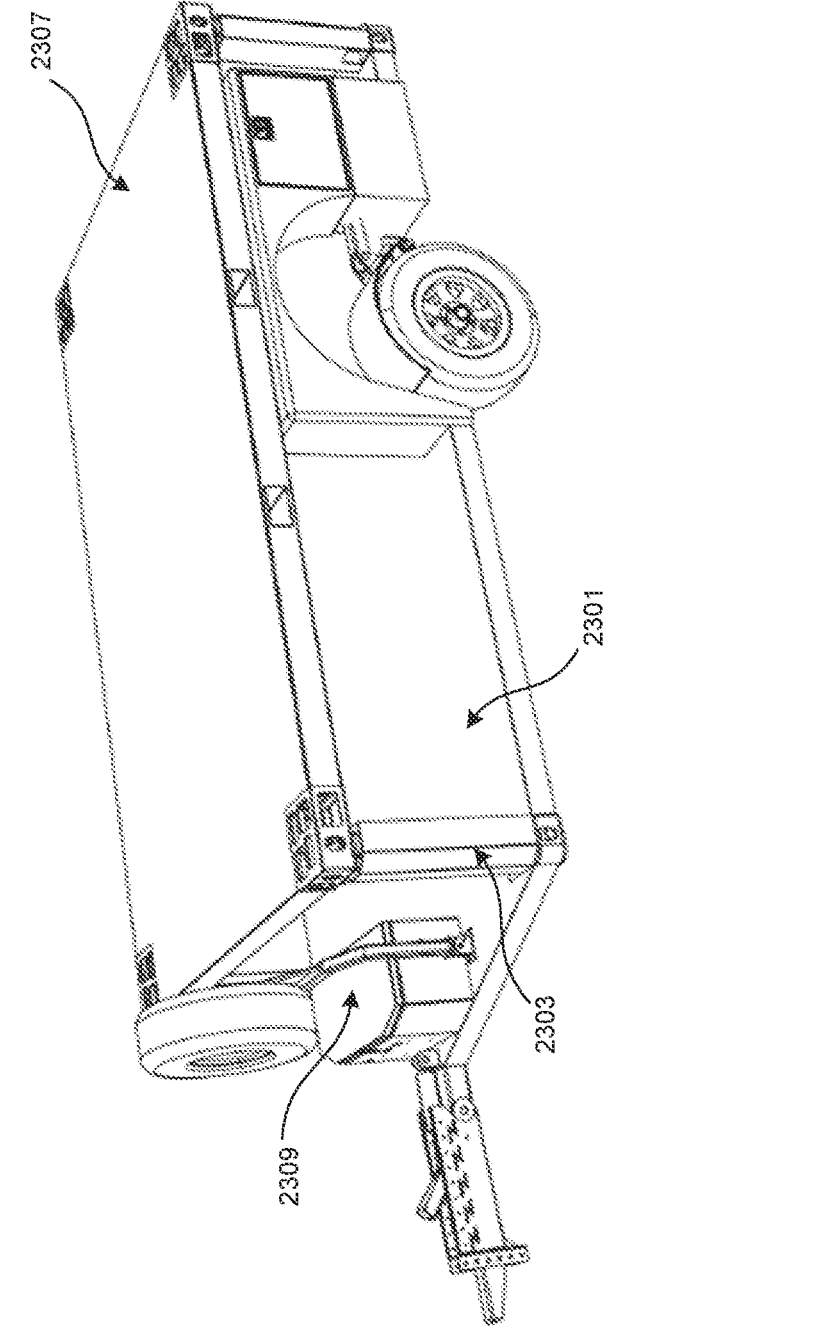
FIGS. 23A-23D are schematic views illustrating assembling of the trailer system in accordance with one or more implementations of the present disclosure.
Figure 23B:
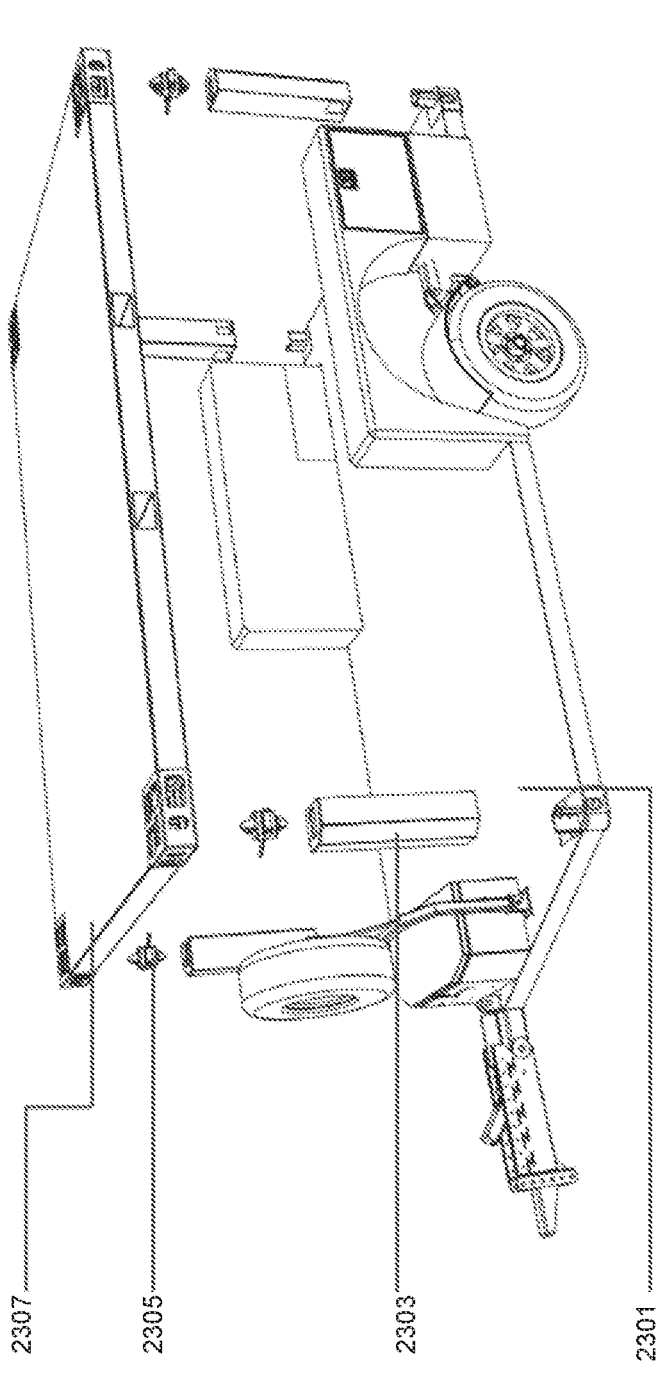

FIGS. 23A-23D are schematic views illustrating assembling of a trailer system 2300 in accordance with one or more implementations of the present disclosure. As shown in FIG. 23A and 23B, the trailer system 2300 includes a trailer base 2301, an adapter post 2303, a twist lock or insert connector 2305, and a flatbed platform 2307. The trailer system 2300 also includes a rotatable hanging member 2309 for holding items such as a spare tire. The trailer system 2300 has a flat, flexible, and modularized platform design such that a user can conveniently assemble/disassemble the trailer system 2300 for suitable purposes (e.g., transportation or residential uses as a recreational vehicle (RV) trailer). For example, a user can use the trailer base 2301 as a flatbed cargo trailer for transporting suitable items (e.g., to carry different items such as a snow mobile, a mountain bike, a motorcycle, a boat, ski equipment, camping gears, etc.).

Figure 23C:
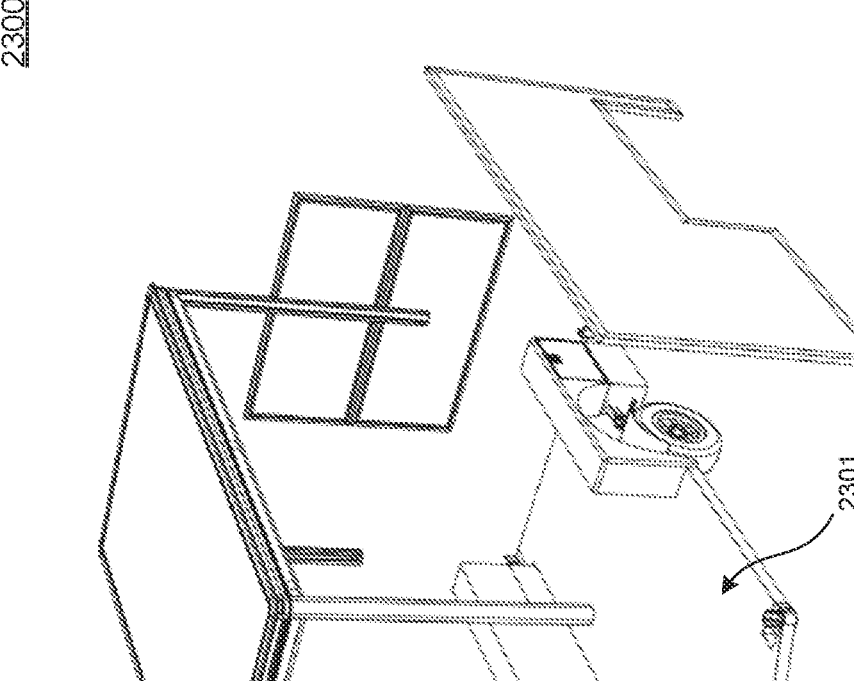
Figure 23D:
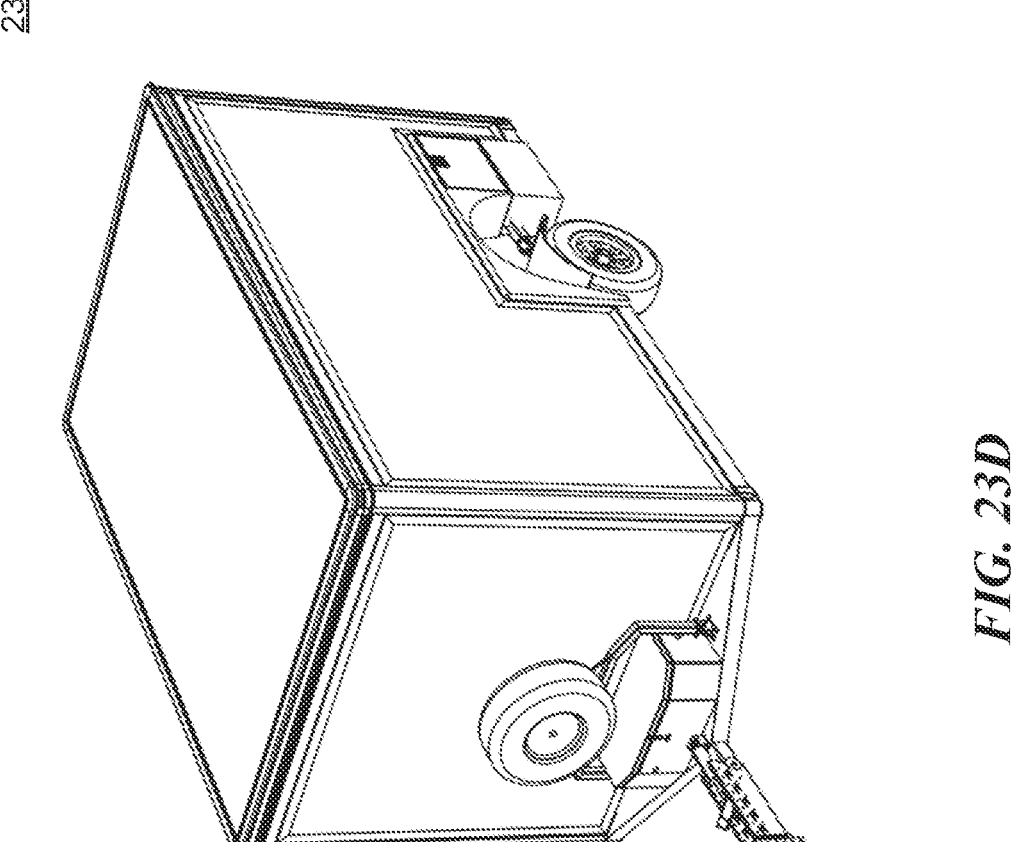

In FIG. 23A, the trailer system 2300 is in a stackable/storage state. FIG. 23B illustrates operations of assembling the trailer system 2300 (i.e., from the stackable/storage state to an operation state). In FIG. 23B, the trailer system 2300 can be disassembled such that the flatbed platform 2307 can be disconnected with the trailer base 2301. In FIG. 23C, an upper structure 2311 (e.g., the top portion 2007 discussed above with reference to FIG. 20C) can be positioned on the trailer base 2301. Multiple wall panels 2313 can be positioned to surround the upper structure 2311 so as to from an enclosure of the trailer system 2300. As shown in FIG. 23D, the trailer system 2300 is assembled as an RV trailer and is ready to be towed/operated. By the foregoing "modularized" configuration, the trailer system 2300 enables multiple uses for various purposes, and thus improves efficiency and save storage spaces.

Additional Considerations

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the described technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/ or modified to provide alternative implementations or sub-combinations. Each of these processes or blocks may be implemented in a variety of different ways. Also, while processes or blocks are at times shown as being performed in series, these processes or blocks may instead be per-formed or implemented in parallel, or may be performed at different times. Further, any specific numbers noted herein are only examples; alternative implementations may employ differing values or ranges.

In the Detailed Description, numerous specific details are set forth to provide a thorough understanding of the pres-ently described technology. In other implementations, the techniques introduced here can be practiced without these specific details. In other instances, well-known features, such as specific functions or routines, are not described in detail in order to avoid unnecessarily obscuring the present disclosure. References in this description to "an implemen-tation/embodiment," "one implementation/embodiment," or the like mean that a particular feature, structure, material, or characteristic being described is included in at least one implementation of the described technology. Thus, the appearances of such phrases in this specification do not necessarily all refer to the same implementation/embodi-ment. On the other hand, such references are not necessarily mutually exclusive either. Furthermore, the particular fea-tures, structures, materials, or characteristics can be com-bined in any suitable manner in one or more implementa-tions/embodiments. It is to be understood that the various implementations shown in the figures are merely illustrative representations and are not necessarily drawn to scale.

Several details describing structures or processes that are well-known and often associated with communications sys-tems and subsystems, but that can unnecessarily obscure some significant aspects of the disclosed techniques, are not set forth herein for purposes of clarity. Moreover, although the following disclosure sets forth several implementations of different aspects of the present disclosure, several other implementations can have different configurations or differ-ent components than those described in this section. Accord-ingly, the disclosed techniques can have other implementa-tions with additional elements or without several of the elements described below.

Many implementations or aspects of the technology described herein can take the form of computer- or proces-sor-executable instructions, including routines executed by a programmable computer or processor. Those skilled in the relevant art will appreciate that the described techniques can be practiced on computer or processor systems other than those shown and described below. The techniques described herein can be implemented in a special-purpose computer or data processor that is specifically programmed, configured, or constructed to execute one or more of the computer-executable instructions described below. Accordingly, the terms "computer" and "processor" as generally used herein refer to any data processor. Information handled by these computers and processors can be presented at any suitable display medium. Instructions for executing computer-or processor-executable tasks can be stored in or on any suitable computer-readable medium, including hardware, firmware, or a combination of hardware and firmware.

Instructions can be contained in any suitable memory device, including, for example, a flash drive and/or other suitable medium.

The term "and/or" in this specification is only an asso-ciation relationship for describing the associated objects, and indicates that three relationships may exist, for example, A and/or B may indicate the following three cases: A exists separately, both A and B exist, and B exists separately.

These and other changes can be made to the disclosed technology in light of the above Detailed Description. While the Detailed Description describes certain examples of the disclosed technology, as well as the best mode contem-plated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the dis-closed technology to the specific examples disclosed in the specification, unless the above Detailed Description section explicitly defines such terms.

A person of ordinary skill in the art may be aware that, in combination with the examples described in the implemen-tations disclosed in this specification, units and algorithm steps may be implemented by electronic hardware, or a combination of computer software and electronic hardware. Whether the functions are performed by hardware or soft-ware depends on particular applications and design con-straint conditions of the technical solutions. A person skilled in the art may use different methods to implement the described functions for each particular application, but it should not be considered that the implementation goes beyond the scope of this application.

Although certain aspects of the invention are presented below in certain claim forms, the applicant contemplates the various aspects of the invention in any number of claim forms. Accordingly, the applicant reserves the right to pur-sue additional claims after filing this application to pursue such additional claim forms, in either this application or in a continuing application.

We claim:

1. A stackable trailer system, comprising:
a platform structure sized in accordance with a dimension of a shipping container;
a corner module configured to be positioned at a corner of the platform structure, wherein the corner module is formed with an upper recess and a lower recess, wherein the upper recess is configured to receive an insert connector, and wherein the lower recess is con-figured to receive a post extending from the platform structure;
a wheel assembly coupled to the platform structure and configured to move the platform structure; and
a deflector module configured to improve aero-dynamic characteristics of the trailer system, wherein the deflec-tor module includes a cover portion and a frame portion, and wherein the frame portion is configured to be attached to a panel module of the trailer system, and wherein the cover portion includes a first surface having a first curvature, a second surface having a second curvature, and a third surface having a third curvature.

2. The system of claim 1, wherein the wheel assembly further comprises a wheel, a first linking member and a second linking member, and wherein the wheel is coupled the first linking member and a second linking member.

3. The system of claim 2, wherein the second linking member is connected to a hydraulic component.

4. The system of claim 2, wherein the wheel is configured to be driven by the second linking member so as to move relatively to the first linking member between a stored position and an operation position.

5. The system of claim 4, wherein when the wheel is in a stored position, the first linking member is generally perpendicular to the second linking member.

6. The system of claim 4, wherein when the wheel is in an operation position, the first linking member is generally parallel to the second linking member.

7. The system of claim 1, further comprising a towing bar assembly coupled to the platform structure, wherein the towing bar assembly is adjustable between a towing position and a stored position.

8. The system of claim 7, wherein the towing bar assembly includes a security mechanism, and wherein the security mechanism includes sleeve component and an elongated member.

9. The system of claim 8, wherein when the towing bar assembly is in a towing position, the elongated member passes through the sleeve component and extends into the platform structure.

10. The system of claim 8, wherein when the towing bar assembly is in a stored position, the elongated member passes through the sleeve component and extends in a direction perpendicular to the platform structure.

11. The system of claim 1, further comprising a panel module configured to provide enclosure and surrounding support to the stackable trailer system.

12. The system of claim 11, wherein the panel module is made of a whole, uncut aluminum panel.

13. The system of claim 11, wherein the panel module includes two aluminum surface layers with an insulation layer therebetween.

14. The system of claim 1, further comprising a door assembly coupled to the platform structure, wherein the door assembly includes a door and a support connector.

15. The system of claim 14, wherein the support connector is configured to cover a gap formed between the door and the platform structure, when the door is in an open position.

16. A method, comprising:
positioning a first corner module on a first post of a first trailer system;
aligning a first end of an insert connector with an upper recess of the first corner module;
positioning the first end of the insert connector in the upper recess of the first corner module;
positioning a second corner module on a second post of a second trailer system, wherein second trailer system includes a lower recess formed on a bottom surface of the second trailer system;
aligning a second end of the insert connector with the lower recess of the second trailer system;
positioning the second end of the insert connector in the lower recess of the second trailer system; and
a deflector module configured to improve aero-dynamic characteristics of the trailer system, wherein the deflector module includes a cover portion and a frame portion, and wherein the frame portion is configured to be attached to a panel module of the trailer system, and wherein the cover portion includes a first surface having a first curvature, a second surface having a second curvature, and a third surface having a third curvature.

17. A method, comprising:
positioning a frame portion of a deflector module on a surface of a panel module of a trailer system;
aligning a cover portion of the deflector module with the frame portion; and
securing the cover portion of the deflector module with the frame portion in a first direction generally perpendicular to the surface or in a second direction generally parallel to the surface, wherein the deflector module is configured to improve aero-dynamic characteristics of the trailer system, wherein the deflector module includes a cover portion and a frame portion, and wherein the frame portion is configured to be attached to a panel module of the trailer system, and wherein the cover portion includes a first surface having a first curvature, a second surface having a second curvature, and a third surface having a third curvature.

* * * * *